United States Patent
Haba et al.

(10) Patent No.: US 11,036,440 B2
(45) Date of Patent: Jun. 15, 2021

(54) IMAGE FORMATION SYSTEM HAVING A PLURALITY OF IMAGE FORMATION APPARATUSES AND METHOD FOR CONTROLLING THEM

(71) Applicant: KONICA MINOLTA, INC., Tokyo (JP)

(72) Inventors: Shoko Haba, Toyokawa (JP); Taketoshi Yamahata, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/679,554

(22) Filed: Nov. 11, 2019

(65) Prior Publication Data
US 2020/0167099 A1  May 28, 2020

(30) Foreign Application Priority Data
Nov. 28, 2018 (JP) .............................. JP2018-222384

(51) Int. Cl.
*G06F 3/12* (2006.01)
*H04N 1/00* (2006.01)

(52) U.S. Cl.
CPC ............ *G06F 3/1204* (2013.01); *G06F 3/128* (2013.01); *G06F 3/1226* (2013.01); *H04N 1/00411* (2013.01); *H04N 2201/0094* (2013.01)

(58) Field of Classification Search
CPC ...... G06F 3/1204; G06F 3/1226; G06F 3/128; H04N 1/00411; H04N 2201/0094
USPC ....................................................... 358/1.15
See application file for complete search history.

(56) References Cited

U.S. PATENT DOCUMENTS

| | | | |
|---|---|---|---|
| 2005/0286080 A1* | 12/2005 | Lee ..................... | H04N 1/00225 358/1.15 |
| 2009/0122340 A1* | 5/2009 | Nagahama ............ | G06F 3/1291 358/1.15 |
| 2014/0022587 A1* | 1/2014 | Coccia .................... | G01S 19/14 358/1.15 |
| 2014/0063542 A1* | 3/2014 | Aoki ....................... | G06F 3/126 358/1.15 |
| 2016/0011834 A1* | 1/2016 | Hama ................... | G06F 3/1259 358/1.15 |
| 2016/0026413 A1* | 1/2016 | Yamada ............. | H04N 1/00896 358/1.14 |
| 2016/0316080 A1* | 10/2016 | Shimamoto ........ | H04N 1/00477 |

FOREIGN PATENT DOCUMENTS

JP  2010268063 A  11/2010

* cited by examiner

*Primary Examiner* — Allen H Nguyen
(74) *Attorney, Agent, or Firm* — Buchanan Ingersoll & Rooney PC

(57) ABSTRACT

An image formation system includes a plurality of image formation apparatuses. A first image formation apparatus among the plurality of image formation apparatuses includes a controller and a display. The controller detects a connection of an external device, acquires identification information of the detected external device, and specifies, by using specific information, one or more image formation apparatuses capable of using the detected external device among the plurality of image formation apparatuses. The display displays identification information of each of the specified one or more image formation apparatuses.

24 Claims, 32 Drawing Sheets

FIG.3

| MFPID | IDS OF AVAILABLE DEVICES |
|---|---|
| MFP100A | 200A |
| MFP100B | 200A,200B |
| MFP100C | 200A,200B,200C |
| ⋮ | ⋮ |

FIG.7
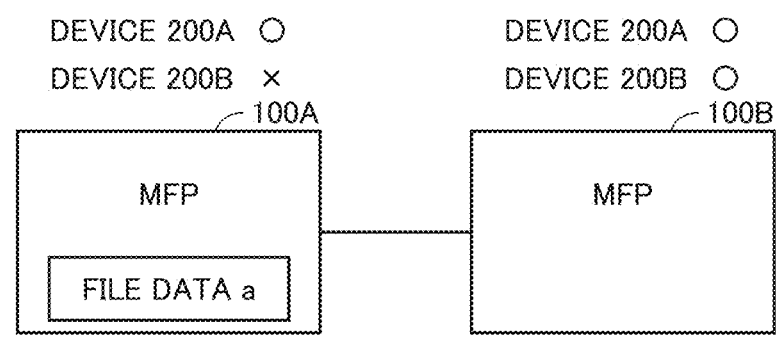
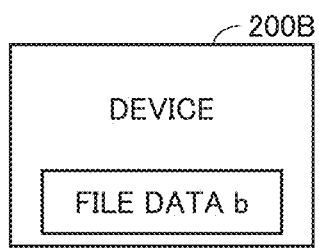

FIG.8
[ SECOND SITUATION ]
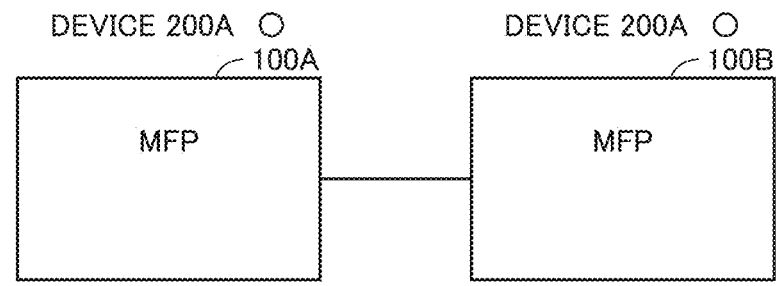
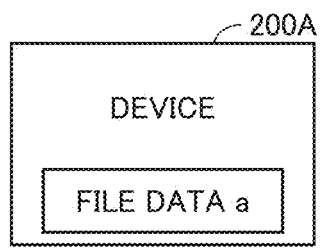

FIG.29

| HELD JOB ID | DATA ID | DEVICE ID | PROCESSING TYPE |
|---|---|---|---|
| J1 | D1 | 200A | PRINT |
| J2 | D2 | 200B | PRINT |
| J3 | D3 | 200C | SCAN |
| ⋮ | ⋮ | ⋮ | ⋮ |

FIG.30

| MFPID | AVAILABLE DEVICE ID |
|---|---|
| MFP100A | 200A |
| MFP100B | 200A |
| MFP100C | 200A,200B,200C |
| ⋮ | ⋮ |

FIG.32

| USER ID | MFP100A | MFP100B | MFP100C | ... |
|---------|---------|---------|---------|-----|
| U1 | A1 | B1 | C1 | ... |
| U2 | A2 | B2 | C2 | ... |
| U3 | A3 | B3 | C3 | ... |
| ⋮ | ⋮ | ⋮ | ⋮ | | ium# IMAGE FORMATION SYSTEM HAVING A PLURALITY OF IMAGE FORMATION APPARATUSES AND METHOD FOR CONTROLLING THEM The entire disclosure of Japanese Patent Application No. 2018-222384, filed on Nov. 28, 2018, is incorporated herein by reference in its entirety.

BACKGROUND

Technological Field

The present disclosure relates to an image formation apparatus, an image formation system, and a control method.

Description of the Related Art

In recent years, an image formation apparatus has been proposed that is connectable with an external device storing file data. The external device is, for example, a universal serial bus (USB) memory. A user ca connect the USB memory to the image formation apparatus, thus causing the image formation apparatus to perform processing (e.g., image formation processing) on the file data in the USB memory.

The image formation apparatus described in Japanese Laid-Open Patent Publication No. 2010-268063 stores a list of external device IDs of external devices, use of which are allowed, in advance. Upon detection of a connection of an external device, the image formation apparatus acquires the external device ID of the external device. The image formation apparatus determines whether the external device ID stored in advance matches the acquired external device ID. When determining that the external device ID stored in advance matches the acquired external device ID, the image formation apparatus allows the use of the external device.

SUMMARY

In the image formation apparatus described in Japanese Laid-Open Patent Publication No. 2010-268063, however, the user may fail to determine Whether the external device of the user can be used in the image formation apparatus to which the user intends to connect the external device. In this case, the user fails to easily recognize in which image formation apparatus the external device can be used.

The present disclosure has been made in view of the above circumstances, and has an object to provide an image formation apparatus and an image formation system that are capable of causing a user to recognize an image formation apparatus capable of using an external device without imposing a burden on the user.

To achieve at least one of the abovementioned objects, according to an aspect of the present invention, an image formation system reflecting one aspect of the present invention comprises a plurality of image formation apparatuses. A first image formation apparatus among the plurality of image formation apparatuses includes a controller and a display. The controller detects a connection of a external device, acquires identification information of the detected external device, and specifies, by using specific information, one or more image formation apparatuses capable of using the detected external device among the plurality of image formation apparatuses. The display displays identification information of each of the specified one or more image formation apparatuses.

To achieve at least one of the abovementioned objects, according to an aspect of the present invention, an image formation apparatus reflecting one aspect of the present invention comprises a controller and a display. The controller detects a connection of an external device, acquires identification information of the detected external device, and specifies, by using specific information, one or more image formation apparatuses capable of using the detected external device among the plurality of image formation apparatuses including the image formation apparatus. The display displays identification information of each of the specified one or more image formation apparatuses.

To achieve at least one of the abovementioned objects, according to an aspect of the present invention, a control method of controlling an image formation apparatus reflecting one aspect of the present invention comprises: detecting a connection of an external device; acquiring identification information of the detected external device; specifying, by using specific information, one or more image formation apparatuses capable of using the detected external device among the plurality of image formation apparatuses including the image formation apparatus; and displaying, on a display, identification information of each of the specified one or more image formation apparatuses.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention.

FIG. 3 shows example specific information of the present embodiment.

FIG. 7 shows a first situation.

FIG. 8 shows a second situation.

FIG. 29 shows an example table for use in another embodiment.

FIG. 30 shows example specific information for use in another embodiment.

FIG. 32 shows an example table for use in another embodiment.

DETAILED DESCRIPTION OF EMBODIMENTS

Hereinafter, one or more embodiments of the present invention will be described with reference to the drawings. However, the scope of the invention is not limited to the disclosed embodiments.

Embodiments of an image formation apparatus will be described below with reference to the drawings. In the following description, the same components and constitutional elements are denoted by the same references, which applies to their names and functions. Detailed descriptions thereof will thus not be repeated. The image formation apparatus can perform various types of processing on file data. The various types of processing include image forming processing of processing an image based on file data on a printing medium (e.g., a sheet of paper). The various types of processing include processing of transmitting file data to another image formation apparatus. The various types of processing include processing of scanning file data.

Hereinafter, the image formation apparatus may also be referred to as a multi functional peripheral (MFP), and the external device may also be referred to as a device. The device stores file data. The device includes, for example, a USB memory, an external HDD, a smartphone, a tablet, and a PC. The device also stores a device identification (ID) for identifying the device. The file data also stores a data ID for identifying the file data.

Embodiment 1

Configuration Example of Image Formation System

Figure 1:
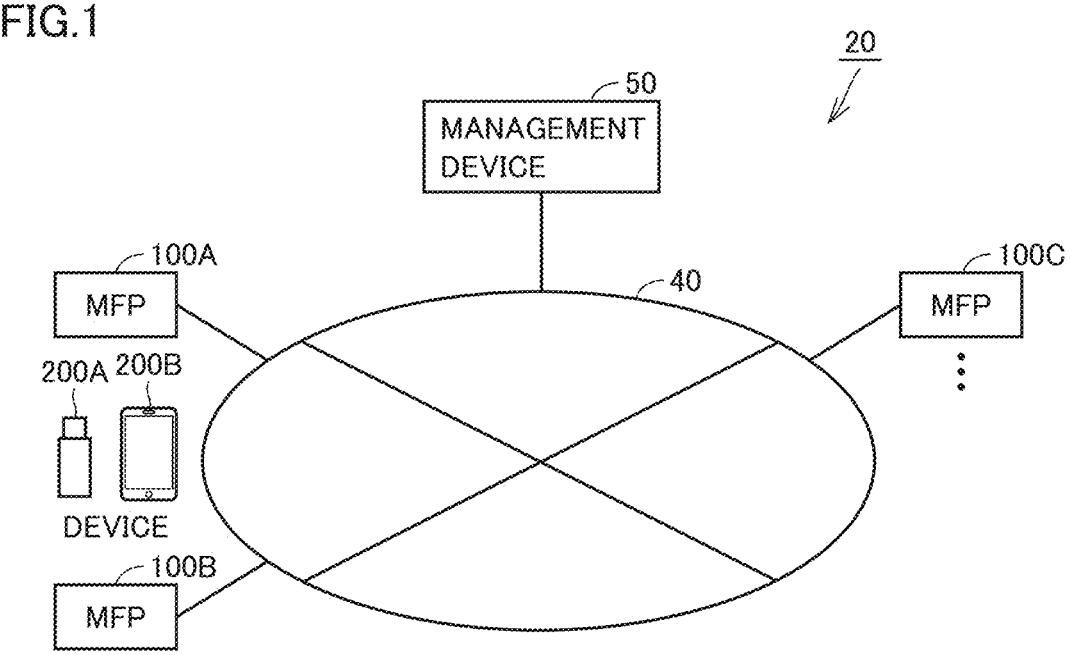
FIG. 1 shows a configuration example of an image formation system according to the present embodiment.

Referring to FIG. 1, an image formation system 20 of the present embodiment will be described. Image formation system 20 includes a plurality of MFPs 100, a management device 50, and a network 40. MFPs 100 and management device 50 are connected to each other through network 40 so as to communicate information therebetween. At least a part of network 40 may be a wired network, and at least another part of network 40 may be a wireless network. As also shown in FIG. 1 and the like, MFPs 100 are denoted by MFP 100A, MFP 100B, MFP 100C, . . . .

The user can connect device 200 to the MFP. Device 200 has a storage function of storing file data and the like. The file data is data to be processed by MFP 100, which is, for example, image data. As also shown in FIGS. 1 and the like, one or more devices 200 are denoted by device 200A, device 200B, . . . . In the following, MFP 100A, MFP 100B, MIT 1000, . . . are denoted by MFP 100, and device 200A, device 200B, . . . are collectively denoted by device 200.

Hardware Configuration Example of MFP

Figure 2:
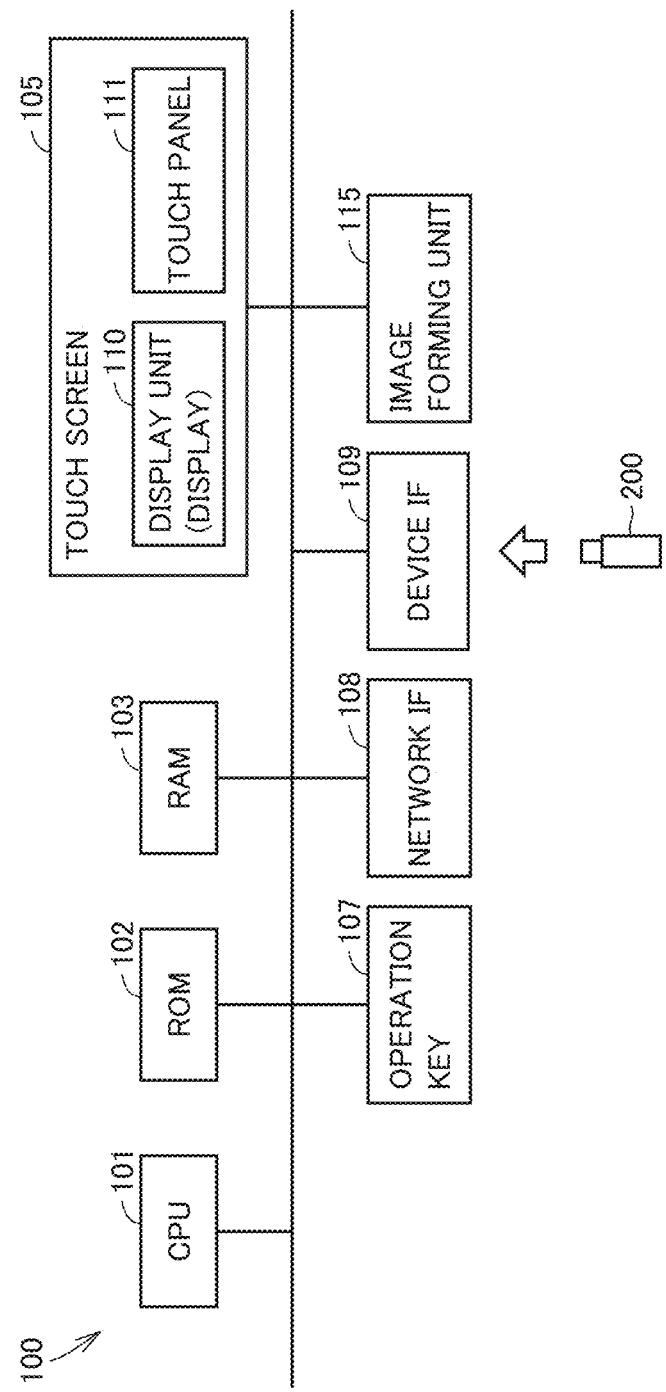
FIG. 2 shows a hardware configuration example of an image formation apparatus of the present embodiment.

Referring to FIG. 2, a hardware configuration example of MFP 100 will be described. MFP 100 includes, for example, a central processing unit (CPU) 101, a read only memory (ROM) 102, a random access memory (RAM) 103, a touch screen 105, an operation key 107, a network interface (IF) 108, a device IF 109, and an image forming unit 115.

CPU 101 executes a program ROM 102 stores data in a nonvolatile manner. RAM 103 stores data in a volatile manner. Touch screen 105 displays various screens. Operation key 107 accepts a user's instruction input to the MFP 100. Network IF 108 is connected with network 40, and MFP 100 can communicate with management device 50 and another MFP 100 through network 40. Device IF 109 is a portion to which device 200 such as a USB memory is connected. Through device IF 109, MFP 100 can, for example, acquire various pieces of information from device 200 connected to device IF 109 and cause device 200 to store various pieces of information. MFP 100 may include a plurality of device IFs 109. To MFP 100 including a plurality of device IFs 109, the user can connect as many devices as device IFs 109.

Touch screen 105 is composed of a display unit 110, which displays various pieces of information and a touch panel 111, which accepts an input from the user. Display unit 110 is typically a liquid crystal display. Touch panel 111 is typically a touch panel. Touch screen 105 is configured by positioning and then fixing touch panel 111 onto display unit 110. Touch panel 111 accepts an input (touch input) made with a user's finger or a stylus pen. Image forming unit 115 performs image forming processing on a sheet of paper. Image forming unit 115 typically has a photoconductor chum or the like.

Specific Information

Specific information used by MFP 100 of the present embodiment will now be described. The specific information is information in which one or more available devices are determined for each MFP. When detecting a connection of a device by the user, MFP 100 determines whether the device is available based on the specific information. In the present embodiment, management device 50 stores the specific information. The specific information is defined by, for example, an administrator of the image formation system. In the following description, an MFP connected with a device by the user is referred to as a "first MFP 100," and an MFP different from first MFP 100 is referred to as a "second MFP" or "another MFP."

When MFP 100 detects a connection of a device available to MFP 100, MFP 100 can receive file data from the device. Subsequently, MFP 100 can transmit the file data to another MFP.

Contrastingly, when MFP 100 detects a connection of a device unavailable to MFP 100, MET 100 does not receive file data from the device. MFP 100 accordingly does not perform processing on the file data from the device. In this manner, MFP 100 has a restricting function of restricting the execution of processing of the file data in a device, use of which is not allowed. Security in image formation system 20 can thus be improved. In the present embodiment, when MFP 100 detects a connection of an unavailable device, MFP 100 can acquire a device ID, which is the identification information of the device, and a data ID, which is the identification information of the file data stored in the device.

FIG. 3 shows example specific information. In the example of FIG. 3, the device ID(s) of device ID(s), available to an MFP, is (are) brought into correspondence with each MFP. It is determined in the example of FIG. 3 that an MFP 100A can use device 200A. It is determined in the example of FIG. 3 that an MFP 100B can use device 200A and device 200B. It is determined in the example of FIG. 3 that an MFP 1000 can use device 200A, device 200B, and device 200C.

Figure 4:
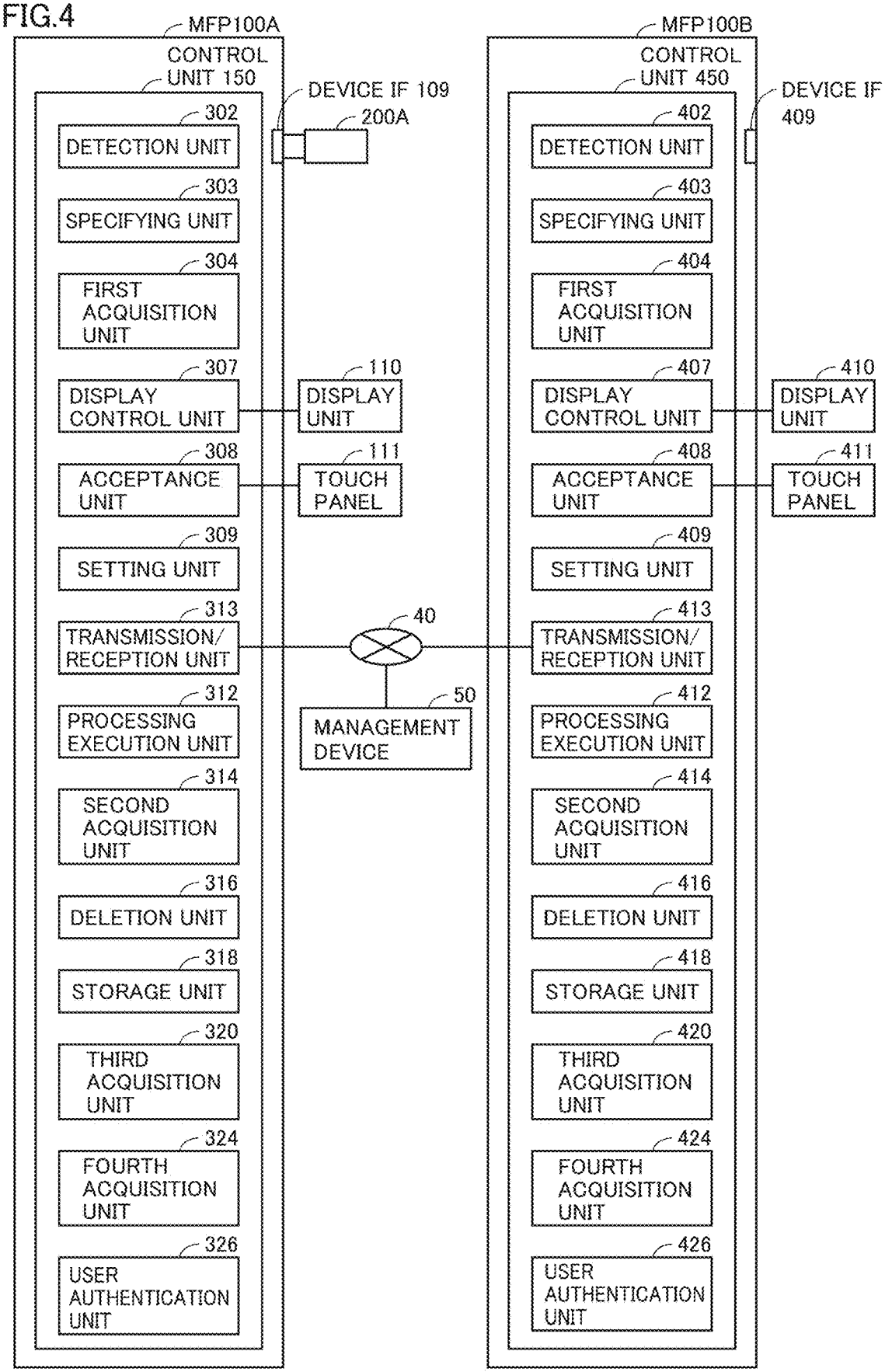
FIG. 4 shows a functional configuration example of the image formation apparatus of the present embodiment.

Functional Configuration Example of Control Unit of MFP 100 of the Present Embodiment FIG. 4 shows a functional configuration example of a control unit 150 of MFP 100. FIG. 4 shows functional configuration examples of control unit 150 of MFP 100A and a control unit 450 of MFP 100B. Control unit 150 is composed of, for example, CPU 101, RPM 102, and RAM 103 of MFP 100A. Control unit 450 is composed of, for example, CPU 101, RPM 102, and RAM 103 of MFP 100B.

Control unit 150 and control unit 450 typically have the same functional configuration example. Control unit 150 of MFP 100A mainly includes a detection unit 302, a first acquisition unit 304, and a display unit 110. The reference signs of the components of control unit 450 of MFP 100B are ones obtained by replacing the hundreds digits of the reference signs of the components included in control unit 150 of MFP 100A with "4". Note that some components of control unit 150 and control unit 450 of FIG. 4 will not be referred to in the following description. The present embodiment describes an embodiment in which, for example, the user connects device 200 to MFP 100A, and then, device 200 is controlled by MFP 100B. Depending on situations, however, the components which are not referred to herein perform processing when the user connects device 200 to MFP 100B, and then, connects device 200 to MFP 100A.

A specifying unit 303 specifies one or more MFPs that can use a detected device using the specific information. It is assumed below that the user has connected device 200 to MFP 100A. Detection unit 302 detects the connection of device 200. Detection unit 302 detects, for example, a device 200 connected to MFP 100A by the user. Subsequently, first acquisition unit 304 acquires the device ID of device 200 detected by detection unit 302. A storage unit 318 stores the specific information shown in FIG. 3 in advance. Specifying unit 303 specifies an MFP 100 that can use device 200 detected by detection unit 302. Specifying unit 303 typically specifies an MFP, which is defined to be able to use the device with the device ID acquired by first acquisition unit 304, with reference to the specific information.

In the example of FIG. 3, device 200A is determined as a device available to MFP 100A. When device 200A is connected to MFP 100A, thus, specifying unit 303 specifies that device 200A can be used in MFP 100A, MFP 100B, and MFP 100C. This allows, for example, MFP 100A to acquire file data stored in device 200A and perform various pieces of processing on the acquired file data. The various pieces of processing include image formation processing of forming an image based on the file data on a sheet of paper. The various pieces of processing also include processing of transmitting the acquired file data to MFP 100B or MFP 100C. The various pieces of processing also include processing of scanning the acquired file data.

Contrastingly, when device 200B is connected to MFP 100A, specifying unit 303 specifies that device 200B can be used in MFP 100B. Specifying unit 303 also specifies that device 200B cannot be used in MFP 100A connected with device 200B.

Figure 5:
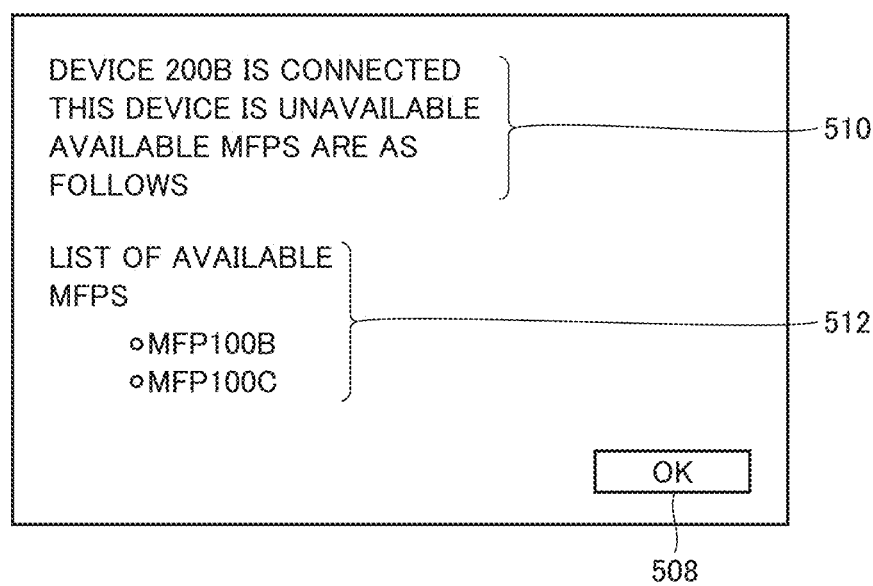
FIG. 5 shows an example display screen of the present embodiment.

Display unit 110 displays the respective MFP IDs of one or more MFPs specified by specifying unit 303 under the control of a display control unit 307. FIG. 5 shows an example screen displayed by display unit 110 when device 200B is connected to MFP 100A. In the example of FIG. 5, a message 510, a list image 512, and an OK button 508 are displayed.

Message 510 includes an image indicating the type of the detected device and an image indicating whether the device can be used in MFP 100A, as shown in FIG. 5. Specifying unit 303 determines whether the detected device can be used in an MFP including specifying unit 303. When specifying unit 303 determines that the device can be used, message 510 shows an image indicating the type of the detected device and an image indicating that the device can be used in MFP 100A. Contrastingly, when specifying unit 303 determines that the device cannot be used, message 510 shows an image indicating the type of the detected device and an image indicating that the device cannot be used in MFP 100A.

List image 512 is an image listing MFPs that can use the detected device 200B. In the example of FIG. 5, MFP 1003 and MFP 110C are displayed as the MFPs that can use device 200B.

Display unit 110 displays the respective MFP IDs of the one or more MEN in accordance with the degree of priority corresponding to the closeness to the MFP including detection unit 302 that has detected the connection of the device for each of one or more MFPs specified by specifying unit 303. Herein, the MFP including detection unit 302 that has detected the connection of the device is a first MFP, that is, MFP 100A. In the present embodiment, an MFP closest to MFP 100A is MFP 100B, and an MFP next closest to MFP 100A is MFP 100C.

In the example of FIG. 5, a mode of display according to the degree of priority is a mode in which the respective MFP IDs of other MFPs are displayed from the top, starting from an MFP closest to MFP 100A. Consequently, when connecting device 200B to MFP 100A, the user can use device 200B and recognize an MFP close to MFP 100A.

For example, when the user connects device 200A to MFP 200A, display unit 110 displays MFP 100A, MFP 100B, and MFP 100C from the top hi list image 512. That is to say, when one or more MFPs specified by specifying unit 303 include MFP 100A including detection unit 302 that has detected the connection of the device, MFP 100A is determined as an MFP closest to MFP 100A.

When the user designates OK button 508 of FIG. 5, display control unit 307 returns a current screen to a screen (e.g., an unshown home screen) previous to the screen of FIG. 5.

Figure 6:
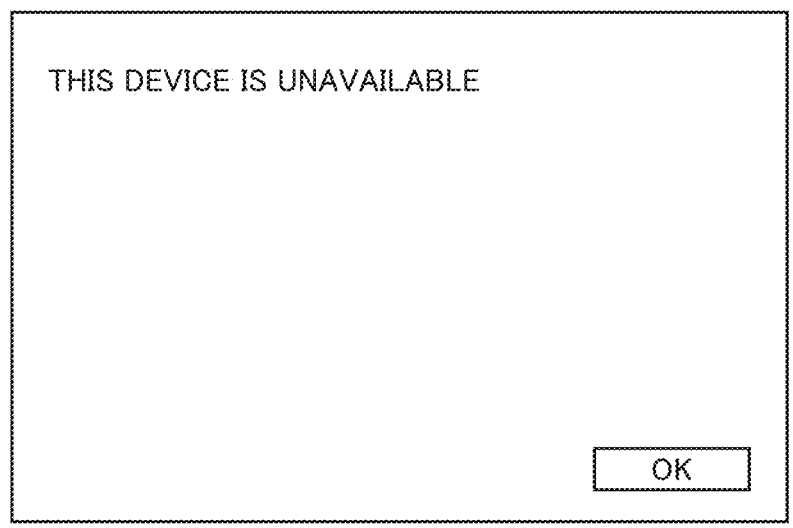
FIG. 6 shows an example display screen of another embodiment.

In some cases, the user fails to determine whether a device held by the user can be used in an MFP to which the user intends to connect the device. FIG. 6 shows an example display screen of a conventional MFP. When a device, the use of which is not allowed in a conventional MFP, is connected to the MFP, the device displays only a message indicating that the relevant device cannot be used, as shown in FIG. 6. The user thus fails to recognize an MFP that can use the device and needs to, for example, inquire of an administrator or the like about an MFP that can use the device. This would impose a burden on the user.

In contrast, image formation system 20 and MFP 100 of the present embodiment display list image 512 as shown in FIG. 5. Even when, for example, device 200B that cannot be used in MFP 100A is connected to MFP 100A, accordingly, the user can recognize MFPs (MFP 100B and MFP 100C) that can use device 200B. This eliminates the need for a user to perform, for example, a task of inquiring of an administrator or the like about an MFP that can use device 200B, leading to reduced burden on the user.

When an enormous number of other MFPs are displayed on the list image, the user has difficulty in recognizing an MFP close to one MFP (MFP 100A). In the present embodiment, thus, display unit 110 displays one or more other MFPs as list image 512 starting from an MFP closest to MFP 100A, as shown in FIG. 5. This allows the user to easily recognize an MFP that can use device 200B and is closet to MFP 100 connected with device 200B by the user. This can reduce the burden on the user.

Embodiment 2

Situation where Image Formation System of Embodiment 2 is Used

Three situations in which image formation system 20 of Embodiment 2 is used will now be described. FIG. 7 is a diagram for illustrating a first situation of the three situations. In the example of FIG. 7, MFP 100A and MFP 100B are installed. MFP 100A and MFP 100B are connected to each other through a network.

As shown in FIG. 3, device 200B cannot be used in MFP 100A, and device 200B can be used in MFP 100B. MFP 100A stores file data a.

In the example of FIG. 7, the user holds device 200B storing file data b, and the user intends to perform printing based on integrated data having integration of file data a and file data b.

Conventionally, the user has been required to transmit file data a in MFP 100A to MFP 100B in advance, which would have imposed a burden on the user.

Thus, image formation system 20 of the present embodiment allows the user to transmit file data a in MFP 100A to MFP 100B when the user connects device 200B to MFP 100A. Subsequently, the user can connect device 200B to MFP 100B to cause MFP 100B to print an image based on the integrated data having integration of file data a and file data b. This can reduce the burden on the user in the first situation.

FIG. 8 is a diagram for illustrating a second situation of the three situations. In the example of FIG. 8, MFP 100A and MFP 100B are installed. MFP 100A and MFP 100B are connected to each other through a network.

In the example of FIG. 8, the user holds device 200A storing file data a, and the user intends to perform image processing on an image (document) based, on file data a and then cause both of MFP 100A and MFP 100B to print the image. The image processing is processing of, for example, adding an image (stamp image) "confidential document" to the image based on file data a.

Conventionally, the user has been required to connect device 200A to MFP 100A and perform setting for image processing, and then, perform an operation to cause MFP 100A to perform printing, and simultaneously, has been required to connect device 200A to MFP 100B and perform setting for image processing, and then, perform an operation to cause MFP 100B to perform printing. This would have imposed a burden on the user.

Figure 9:
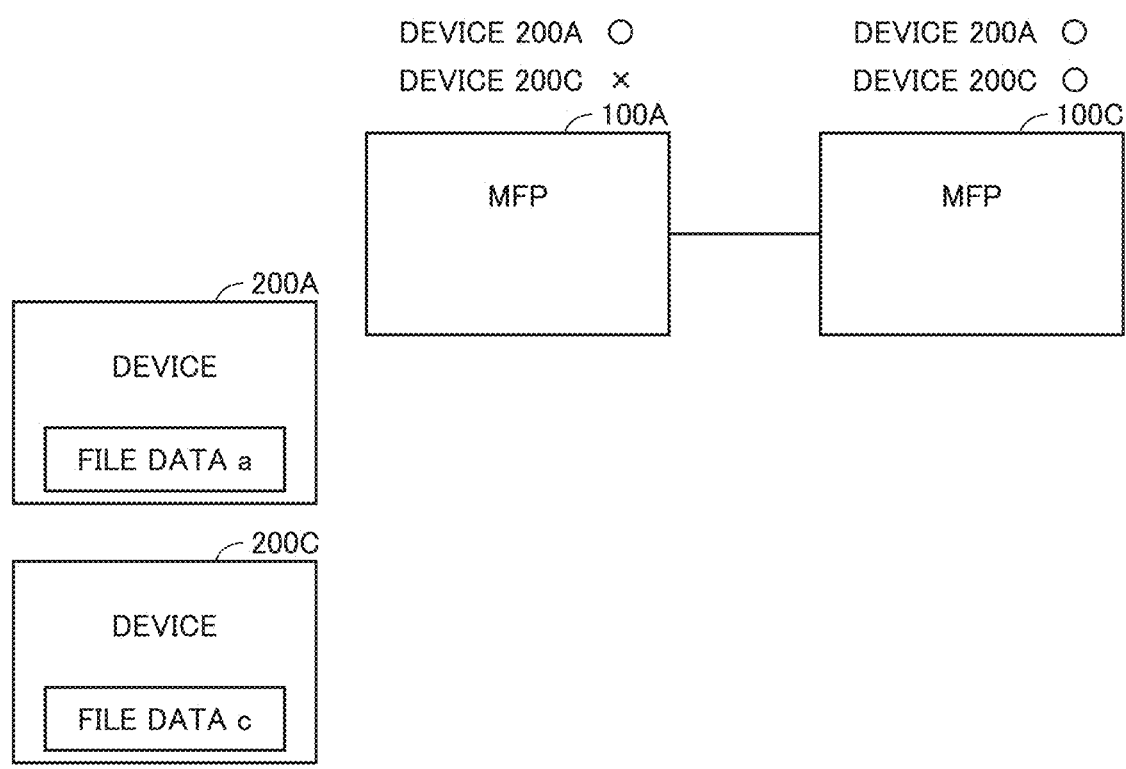
FIG. 9 shows a third situation.

Image formation system 20 of the present embodiment allows the user to perform setting to perform image processing in MFP 100A, and also reflect this setting on both of MFP 100A and MFP 100B. The burden on the user can thus be reduced in the second situation, FIG. 9 is a diagram for illustrating a third situation of the three situations. In the example of FIG. 9, MFP 100A and MFP 100C are installed. MFP 100A and MFP 100C are connected to each other through a network.

In the example of FIG. 9, the user holds device 200A storing file data a and device 200C storing file data c. The user intends to perform image processing on an image (document) based on file data a and then cause MFP 100A to print the image, and also intends to perform image processing on an image (document) based on file data c and then cause MFP 100 to print the image.

Conventionally, the user would have to connect device 200A to MFP 100A and perform setting for image processing, and then, perform an operation to cause MFP 100A to perform printing. The user also would have to connect device 200C to MFP 100C to perform setting for image processing, and then, perform an operation and cause MFP 100C to perform printing. The conventional image formation system would thus have imposed a burden on the user.

Thus, image formation system 20 of the present embodiment can connect both of device 200A and device 200C to MFP 100A and reflect the setting to perform image processing in MFP 100A on both of MFP 100A and MFP 100C. Further, the user can determine an MFP, which is caused to process file data a stored in device 200A, and an MFP, which is caused to process file data c stored in device 200C. This can reduce the burden on the user in the third situation.

Transition of Display Screen

The transition of a display screen shown in display unit 110 or a display unit 410 will now be described. MFP 100 of Embodiment 1 has been described above as displaying the image of FIG. 5. In the present embodiment, display control unit 307 causes MFP 100 to display MFP selection screens of FIGS. 10 and 11.

Figure 10:
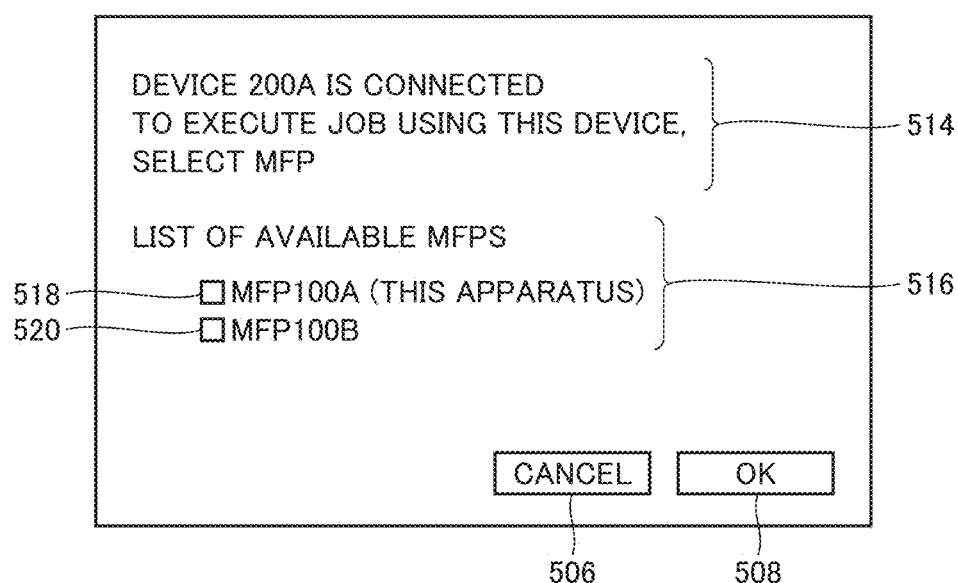
FIG. 10 shows an example display screen of another embodiment.

FIG. 10 shows a screen displayed by display control unit 307 when the user connects device 200A to MFP 100A. Device 200A is a device that can be used in MFP 100A, as also shown in FIG. 3. Display control unit 307 displays a message 514 and a list image 516 on the screen of FIG. 10. Message 514 includes an image indicating the type of the detected device and an image urging the user to select an MFP that is to perform a job using the device. List image 516 is an image listing MFPs that can use the detected device (device 200A).

In list image 516 of FIG. 10, MFP 100A and MFP 100B are shown as MFP IDs of MFPs that can use device 200A. A checkbox is shown in correspondence with each MFP ID in list image 516. In the example of FIG. 8, a checkbox 518 is shown in correspondence with MFP 100A. A checkbox 520 is shown in correspondence with MFP 100B.

The user checks a checkbox corresponding to an MFP, which the user intends to cause to perform processing based on the file data stored in device 200A. The user touches OK button 508 after checking, thus causing the MFP corresponding to the checked checkbox to perform processing based on the file data.

For example, when checking checkbox 518 corresponding to MFP 100A and touching OK button 508, the user can cause MFP 100A to perform processing based on the file data stored in device 200A. When checking both of checkbox 518 corresponding to MFP 100A and checkbox 520 corresponding to MFP 100B and touching OK button 508, the user can cause both of MET 100A and MFP 100B to perform processing based on the file data stored in device 200A.

Figure 11:
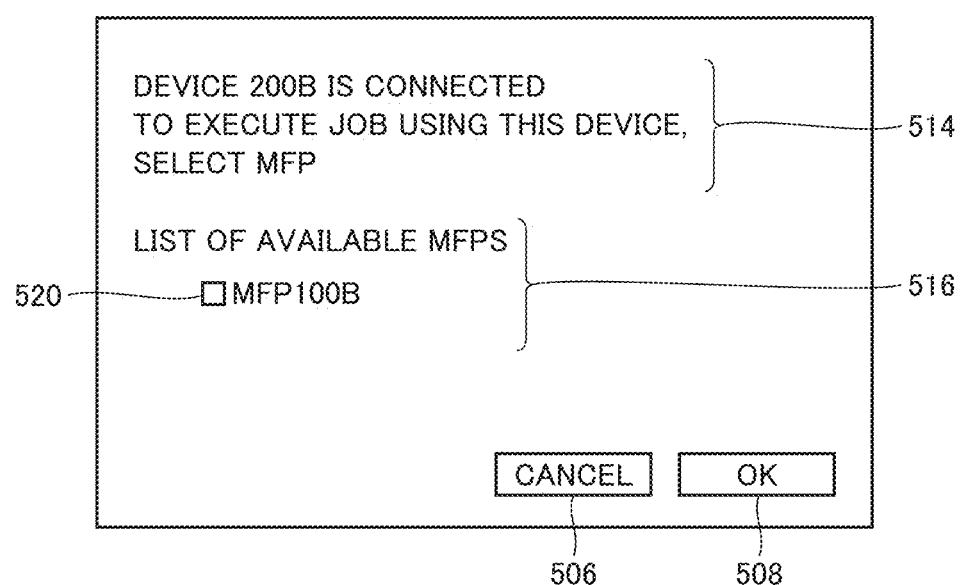
FIG. 11 shows an example display screen of the other embodiment.

FIG. 11 is a screen displayed by display control unit 307 when the user connects device 200B to MFP 100A. Device 200B is a device that cannot be used in MFP 100A, as also shown in FIG. 3. In the example of FIG. 11, message 514 includes an image indicating the type of the detected device and an image urging the user to select an MFP that is to perform a job using the device. List image 516 is an image listing MFPs that can use the detected device (device 200B).

In list image 516 of FIG. 11, MFP 100B is shown as an MFP ID of the MFP that can use device 200B. A checkbox is shown in correspondence with each MFP ID in list image 516. In the example of FIG. 11, checkbox 520 is shown in correspondence with MFP 100B.

The user checks a checkbox corresponding to an MFP, which the user intends to cause to perform processing based on the file data stored in device 200B. The user touches OK button 508 after checking, thus causing the MFP corresponding to the checked checkbox to perform processing based on the file data. For example, when checking checkbox 520 corresponding to MFP 100B and touching OK button 508, the user can cause MFP 100B to perform processing based on the file data stored in device 200A.

On the screens of FIGS. 10 and 11 and screens, which will be described below, the contents set by the user are stored in storage unit 318 as setting information.

When the user touches a cancel button 506 on the screens of FIGS. 10 and 11 and the screens described below, display control unit 307 returns a current screen to the previous screen. For example, when the user touches cancel button 506 on the screens of FIGS. 10 and 11, display control unit 307 displays a home screen (not shown specifically), which is a screen previous to the displayed screen.

The following will describe the first situation, that is, a case in which the user connects device 200B to MFP 100A. In this case, MFP 100A displays the screen of FIG. 11 when the user connects device 200B to MFP 100A.

Figure 12:
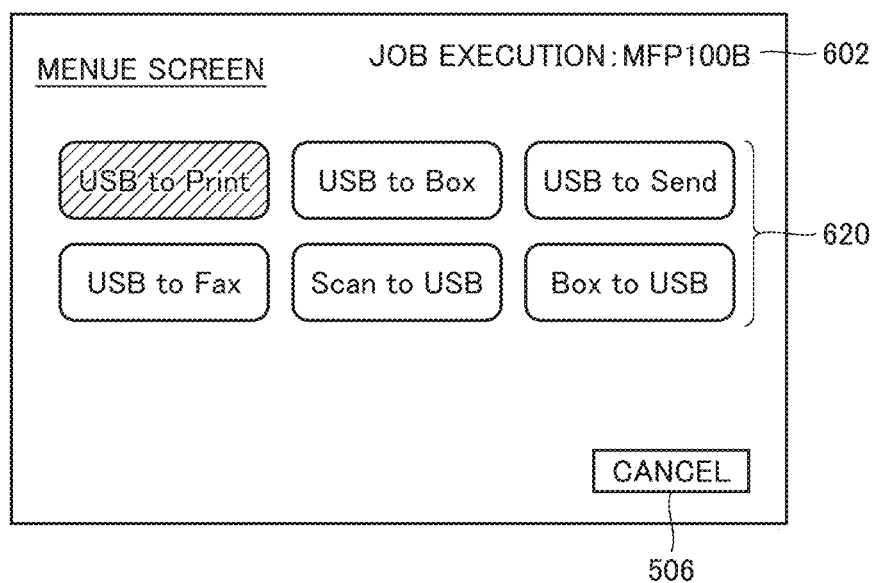
FIG. 12 shows an example display screen of the other embodiment.

While display control unit 307 is displaying the MFP selection screen (refer to FIG. 10 or 11), upon a user's input of an MFP, which is caused to perform a job, in list image 516 on the MFP selection screen, display control unit 307 displays a menu screen of FIG. 12. The example of FIG. 12 is a screen displayed when the user designates MFP 100B. In the example of FIG. 12, a designated MFP ID image 602, menu entries 620, and the like are displayed.

The MFP shown in MFP ID image 602 is an MFP designated by the user on the screen of FIG. 10 or 11. Menu entries 620 are entries of pieces of processing that the MFP designated by the user is caused to perform. In the example of FIG. 12, processing "USB to Print" and the like are shown as menu entries 620. This processing is processing of printing file data in the USB that is device 200B. The designated menu is displayed in a form different from the form of a menu that is not designated. In the example of FIG. 12, the designated menu is shown hatched.

Figure 13:
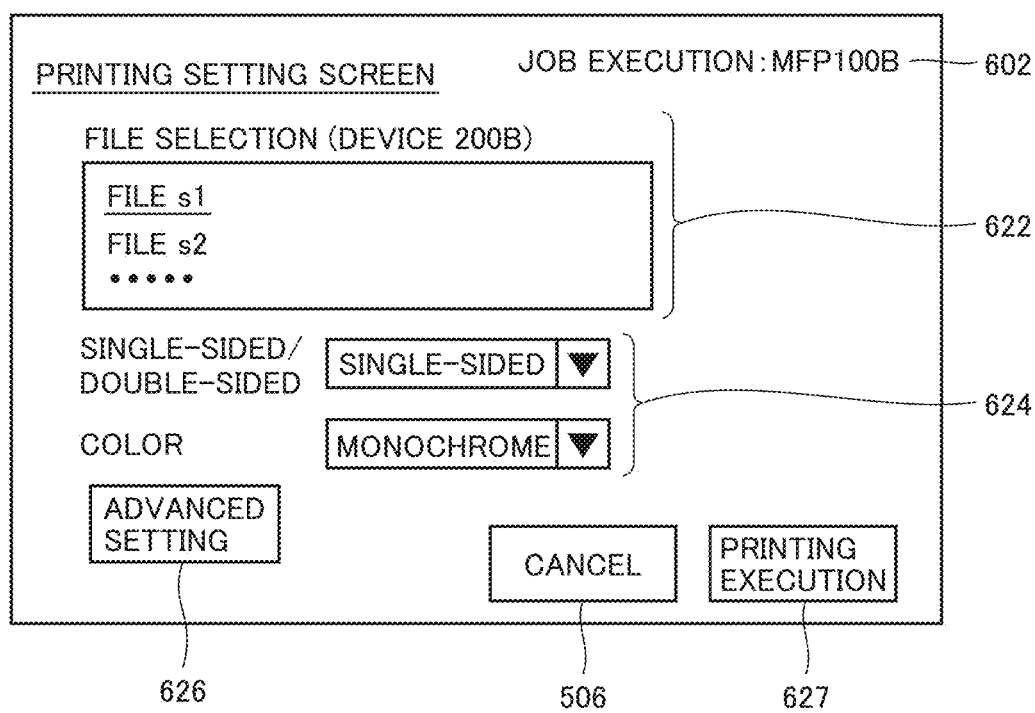
FIG. 13 shows an example display screen of the other embodiment.

While display control unit 307 is displaying the menu screen (refer to FIG. 12), upon a user's designation of a menu, display control unit 307 displays a processing setting screen. The processing setting screen is a screen for setting the processing designated on the menu screen. FIG. 13 shows an example printing setting screen of the processing setting screen.

In the example of FIG. 13, designated MFP ID image 602, a file selection image 622, a first printing condition image 624, and an advanced setting button 626 are displayed. File selection image 622 is an image for causing a user to select file data, which the user desires to process, in the file data stored in device 200B. First printing condition image 624 is an image for causing the user to set a first printing condition. First printing condition image 624 of FIG. 13 is an image for causing the user to set, for example, single-sided printing or double-sided printing, or monochrome printing or color printing. Advanced setting button 626 is an image for causing the user to set a second printing condition different from the first printing condition. As the user operates advanced setting button 626 of FIG. 13, for example, the user can set whether to perform the above image processing (processing of adding words "confidential document").

On the screen of FIG. 13, the user can also designate file data (e.g., file data a of FIG. 7) stored in MFP 100A that displays the screen of FIG. 13. Displayed on the screen in this case as MFP ID image 602 is not an image "JOB EXECUTION: MFP 100B" of FIG. 13, but an image "JOB EXECUTION: MFP 100A." Further, also for file data a, the user can set the printing condition with reference to, for example, first printing condition image 624 and an image displayed through the operation of advanced setting button 626.

A printing execution button 627 is a button for causing the designated MFP to perform processing (printing processing) on the designated file data on, for example, the printing condition set on the printing selling screen.

When the user touches printing execution button 627. MFP 100A transmits a first command including the setting information set in FIGS. 12 and 13 to the MIT designated on the screen of FIG. 10 or 11.

This first command includes job data, a data ID, and a device ID. The job data includes an address of a destination MFP, a type of processing that the destination MFP is caused to perform and a printing condition. The destination MFP is designated by the user in FIG. 10 or 11. The type of processing is designated by the user in FIG. 12. The data ID is designated by the user in file selection image 622 of FIG. 13. The printing condition is designated by the user in the image displayed through the operations of first printing condition image 624 and advanced setting button 626 of FIG. 13. When the user connects device 200B to MFP 100A, MFP 100A acquires a device ID from device 200B.

Figure 14:
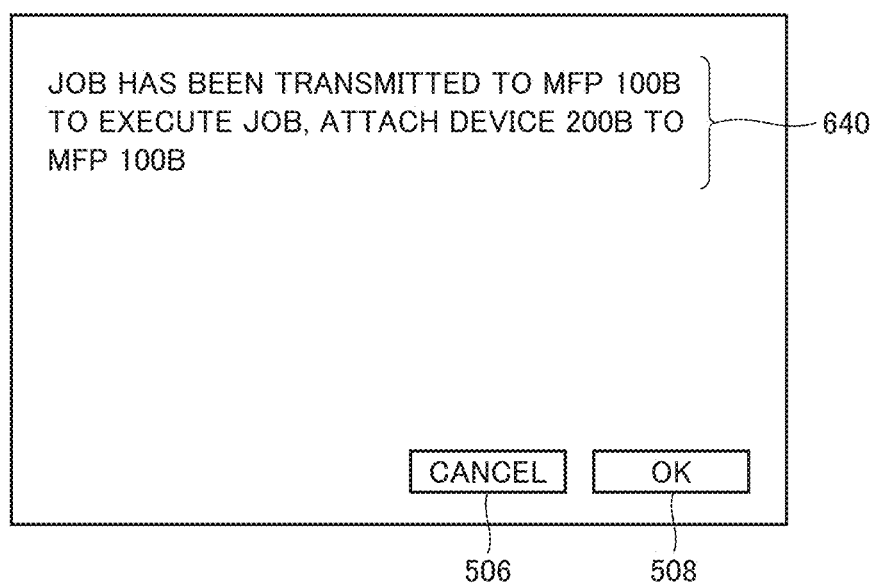
FIG. 14 shows an example display screen of the other embodiment.

When the user touches printing execution button 627, display control unit 307 displays an instruction screen of FIG. 14. The instruction screen is a screen showing an instruction to the user. On the instruction screen, an instruction image 640 instructing the user to connect device 200B to MFP 100B is displayed.

Upon receipt of the first command, MFP 100B holds the job based on the first command Subsequently, when the user who has visually recognized the screen of FIG. 14 connects device 200B to MFP 100B, MFP 100B executes the held job.

When the user connects device 200A to MFP 100A, MFP 100A displays the screen of FIG. 10. Device 200A is an MFP that can be used in MFP 100A. In this case, since device 200A is a device that can be used in MFP 100A, MFP 100A can acquire file data from device 200A.

MFP 100A transmits a second command to the MFP designated by the user. The second command is a command including job data and file data acquired from device 200A. Upon receipt of the second command, MFP 100B executes the job based on the second command. MFP 100B typically performs processing on the file data included in the second command based on the job data included in the second command.

Figure 15:
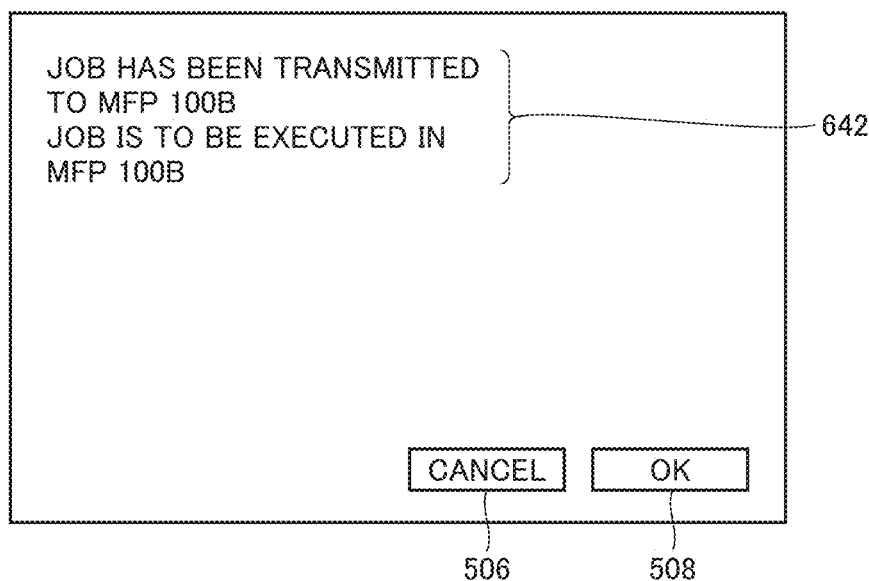
FIG. 15 shows an example display screen of the other embodiment.

When MFP 100B is designated and OK button 508 is touched on the screen of FIG. 10, display control unit 307 displays a result screen of FIG. 15. On the screen of FIG. 15, a result image 642 indicating that the job is to be executed in MFP 100B is displayed.

Figure 16:
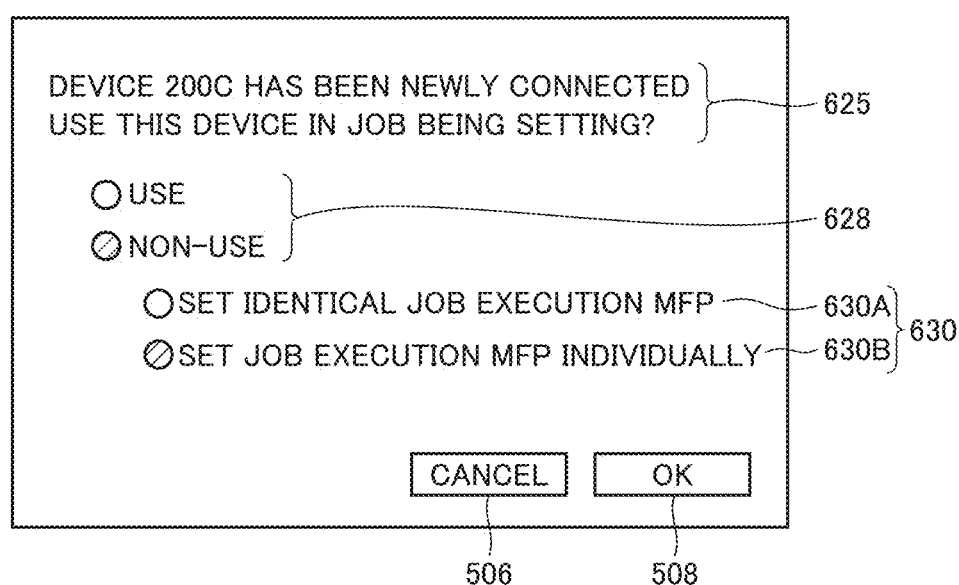
FIG. 16 shows an example display screen of the other embodiment.

For example, when a device is newly connected to MFP 100A during designation of an MFP that is caused to execute a job or during setting of a printing condition or the like, display control unit 307 of MFP 100A displays a screen of FIG. 16. In the example of FIG. 16, a new device is "device 200C." Also, display control unit 307 displays the screen of FIG. 16 as a pop-up screen such that the screen overlaps the displayed screen (e.g., the screen of FIG. 15).

On the screen of FIG. 16, a message 625, a use/non-use image 628, and an MFP setting image 630 are displayed. Message 625 shows the device ID of a newly detected device and an indication to ask the use of the file data stored in the new device in the "job being setting." Use/non-use image 628 is an image for causing the user to set whether to use the file data stored in the new device in the "job during setting." MFP setting image 630 is displayed when the user sets the use of the file data stored in the new device in use/non-use image 628. MFP setting image 630 is an image for causing the user to set whether to cause the identical MFP or different MFPs to process the file data stored in device 200A originally connected and the file data stored in device 200C newly connected. When the user desires "to cause the identical MFP to process the file data stored in device 200A originally connected and the file data stored in device 200C newly connected," the user designates an entry 630A "SET IDENTICAL JOB EXECUTION MFP" of MFP setting image 630. Contrastingly, when the user desires "to cause different MFPs to process the file data stored in device 200A originally connected and the file data stored in device 200C newly connected," the user designates an entry 630B "SET JOB EXECUTION MFP INDIVIDUALLY" of MFP setting image 630.

When "NON-USE" is selected in use/non-use image 628 and OK button 508 is operated, the pop-up screen of FIG. 16 is deleted. Also when cancel button 506 is operated in use/non-use image 628, the pop-up screen of FIG. 16 is cleared.

Figure 17:
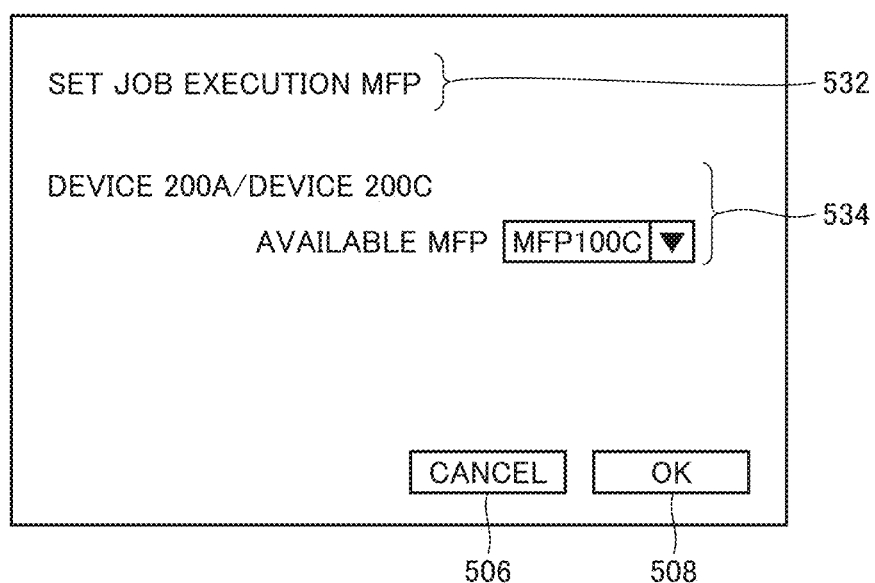
FIG. 17 shows an example display screen of the other embodiment.

When the user designates entry 630A and touches OK button 508, display control unit 307 displays a screen of FIG. 17. On the screen of FIG. 17, a message 532 and an MFP setting image 534 are displayed. On the screen of FIG. 17, message 532 shows an indication to set an MFP which is caused to execute a job. MFP setting image 534 is an image for causing the user to set an MFP that uses both of device 200A and device 200C.

Figure 18:
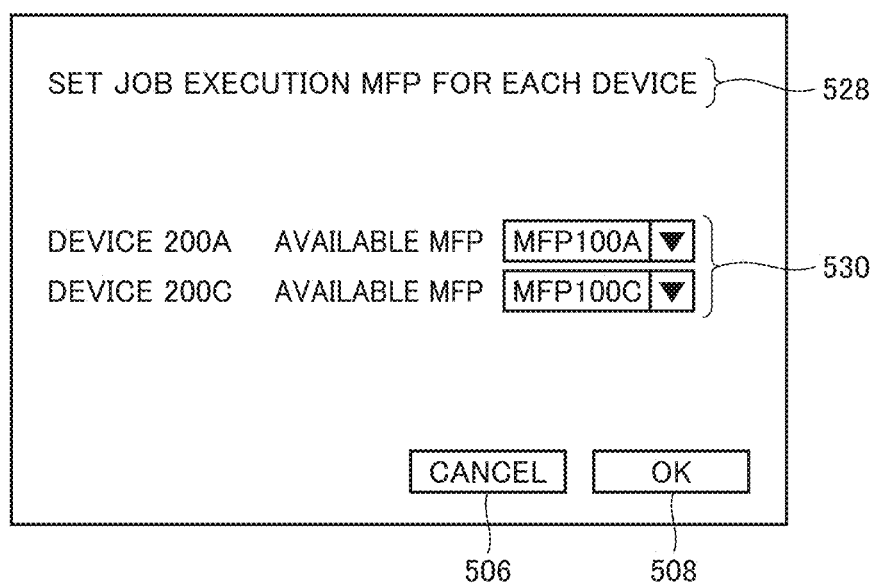
FIG. 18 shows an example display screen of the other embodiment.

When the user designates entry 630B and touches OK button 508, display control unit 307 displays a screen of FIG. 18. On the screen of FIG. 18, a message 528 and an MFP setting image 530 are displayed. On the screen of FIG. 18, message 528 shows an indication to set an MFP which is caused to execute a job. MFP setting image 534 is an image that causes the user to individually set an MFP that uses device 200A and an MFP that uses device 200C.

When the user designates an MFP on the screen of FIG. 17 or the screen of FIG. 18, the screen of FIG. 12 is displayed. The user designates processing, which the user causes the designated MFP to perform, on the screen of FIG. 12. When the user designates processing to be performed on the screen of FIG. 12, display control unit 307 displays the screen of FIG. 13. When the processing that the user causes the MFP to perform has been determined on the screen of FIG. 12 for device 200A originally connected, that is, when device 200C is newly connected to MFP 100A during display of the screen of FIG. 13, the user is first caused to designate file data stored in device 200A and set a printing condition. Subsequently, display control unit 307 further displays the screen of FIG. 12 and causes the user to designate processing which is caused to be performed by an MFP (an MFP designated by the user) for device 200C newly connected. At the same time, display control unit 307 displays the screen of FIG. 13 and causes the user to designate file data stored in device 200C newly connected and set a printing condition. When device 200A and device 200C are caused to perform the same processing by the designated MFP, for device 200C, the screen of FIG. 13 may be displayed without display of the screen of FIG. 12.

In this manner, MFP 100A performs settings of device 200A originally connected to MFP 100A and device 200C newly connected to MFP 100A. Herein, the settings refer to all settings including the setting of an MFP which is caused to process file data stored in a device, the designation of file data stored in a device, and the setting of a printing condition.

Figure 19:
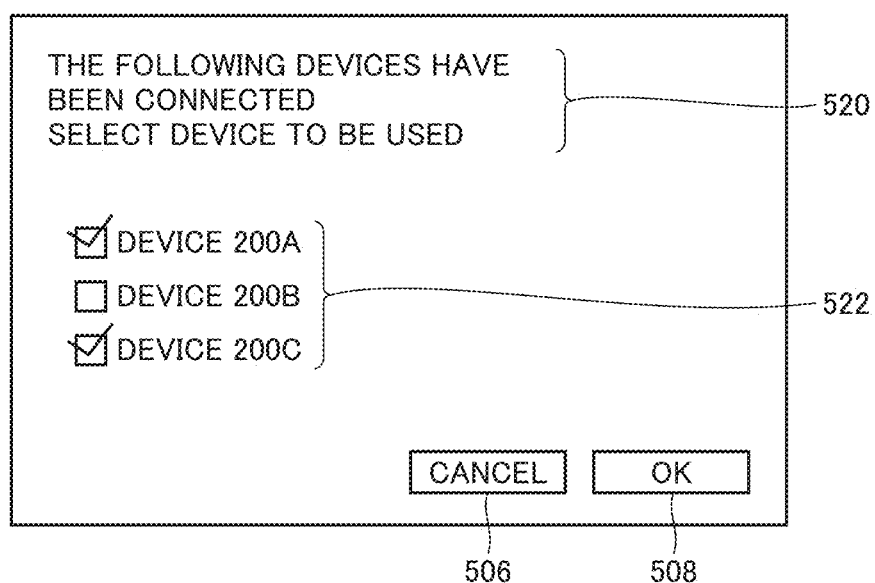
FIG. 19 shows an example display screen of the other embodiment.

Assume here that the user connects a plurality of devices to MFP 100A in the third situation. When a plurality of devices are connected, display control unit 307 displays, not the screens of FIGS. 10 and 11, but the screen of FIG. 19. FIG. 19 shows a screen displayed when device 200A, device 200B, and device 200C are connected to MFP 100A.

Message 520 shows the connected devices and an indication to ask the user about the devices to be used among the connected devices. A device image 522 is an image showing the device ID of connected device 200C. Each device ID is displayed in correspondence with a checkbox. The user checks the checkbox of the device that the user intends to use. In the third situation, for example, the user checks the checkbox of device 200A and the checkbox of device 200C.

Figure 20:
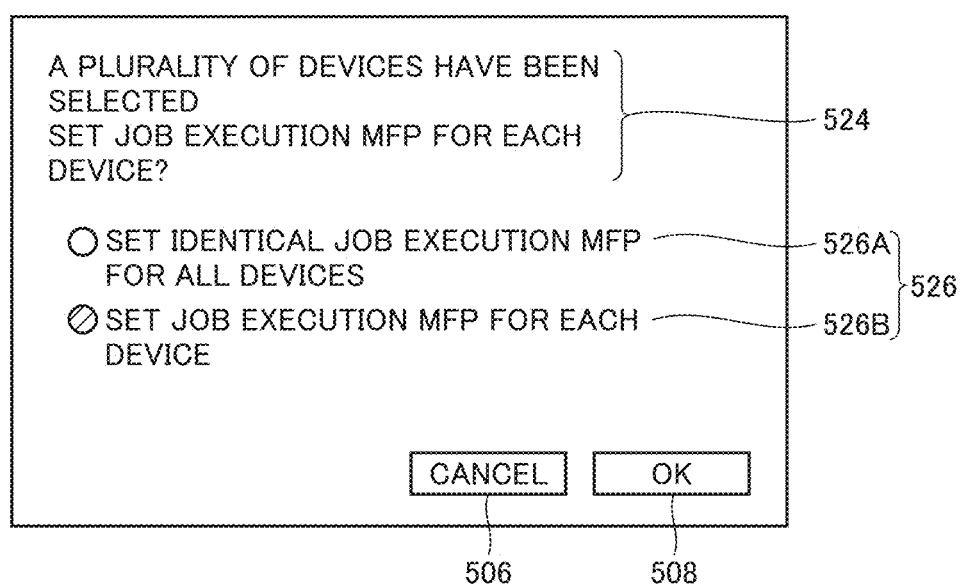
FIG. 20 shows an example display screen of the other embodiment.

When the user touches OK button 508 after checking the checkbox of the device ID, display control unit 307 displays the screen of FIG. 20. On the screen of FIG. 20, a message 524 shows that, for example, a plurality of devices have been detected.

An MFP setting image 526 is an image for causing, for a plurality of designated devices which have been designated, the user to set whether to cause the identical MFP or different MFPs to process pieces of file data stored in the plurality of devices.

When the user desires to cause, for a plurality of designated devices which have been designated, the identical MFP to process pieces of file data stored in the plurality of devices, the user designates an entry 526A "SET IDENTICAL JOB EXECUTION MFP IN ALL DEVICES" of MFP setting image 526. Contrastingly, when the user desires to causes, for a plurality of designated devices which have been designated, different MFPs to process pieces of file data stored in the plurality of devices, the user designates an entry 526B "SET JOB EXECUTION MFP FOR EACH DEVICE" of MFP setting image 526.

When the user designates entry 630A and touches OK button 508, display control unit 307 displays the screen of FIG. 17. Contrastingly, when the user designates entry 630B and touches OK button 508, display control unit 307 displays the screen of FIG. 18.

Figure 21:
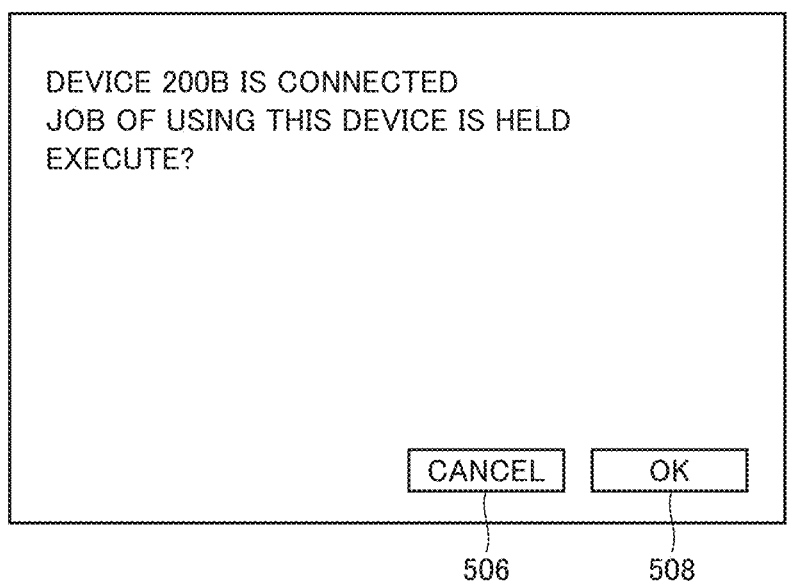
FIG. 21 shows an example display screen of the other embodiment.

A case in which, for example, the user who has visually recognized the screen of FIG. 14 connects device 200B to MFP 100B in the first situation will now be described. When device 200B is connected to MFP 100B, a display control unit 407 of MFP 100B displays a screen of FIG. 21 on display unit 410. The screen of FIG. 21 is a screen for confirming the user whether MFP 100B can execute the process to be performed on the file data of a device 200B, which is held as a held job by MFP 100B.

Figure 22:
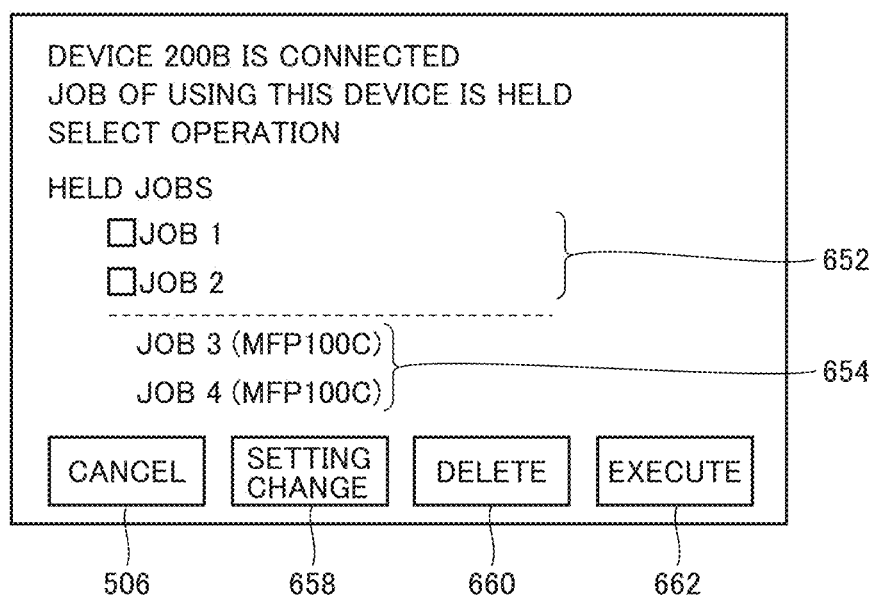
FIG. 22 shows an example display screen of the other embodiment.

Upon the user who has visually recognized the screen of FIG. 14 connecting device 200B to MFP 100B, when MFP 100B has a plurality of held jobs, display control unit 407 displays a screen of FIG. 22. The screen of FIG. 22 is displayed based on, for example, a held job table of FIG. 29, Which will be described below. On the screen of FIG. 22, a held job image 652 listing held jobs in MFP 100B, a held job image 654 showing held jobs in another MFP (in the example of FIG. 22, MFP 100C), and the like are displayed.

On held job image 652, each job is displayed in correspondence with a checkbox. The user can operate the screen of FIG. 22 to cause MFP 100B to perform setting change, deletion, and execution for each job shown in held job image 652.

For example, when checking the checkbox and then touching a setting change button 658, the user can cause MFP 100B to perform setting change on the checked job. When the user touches setting change button 658, display control unit 407 displays the screen of FIG. 12 or the screen of FIG. 13.

For example, when checking the checkbox and then touching a delete button 660, the user can cause MFP 100B to delete the checked job.

For example, when checking the checkbox and touching an execute button 662, the user can cause MFP 100B to perform the checked job.

For example, the user may connect device 200B to MFP 200B for another purpose different from the execution of the held job. The display of the screen of FIG. 21 or 22 can cause the user not to execute a held job even when device 200B is connected to MFP 200B for the other purpose. The user's convenience can thus be improved. In a modification, MFP 100B may execute processing on file data in device 200B connected thereto without display of FIGS. 20 and 21.

Flowchart of Image Formation System

Figure 23:
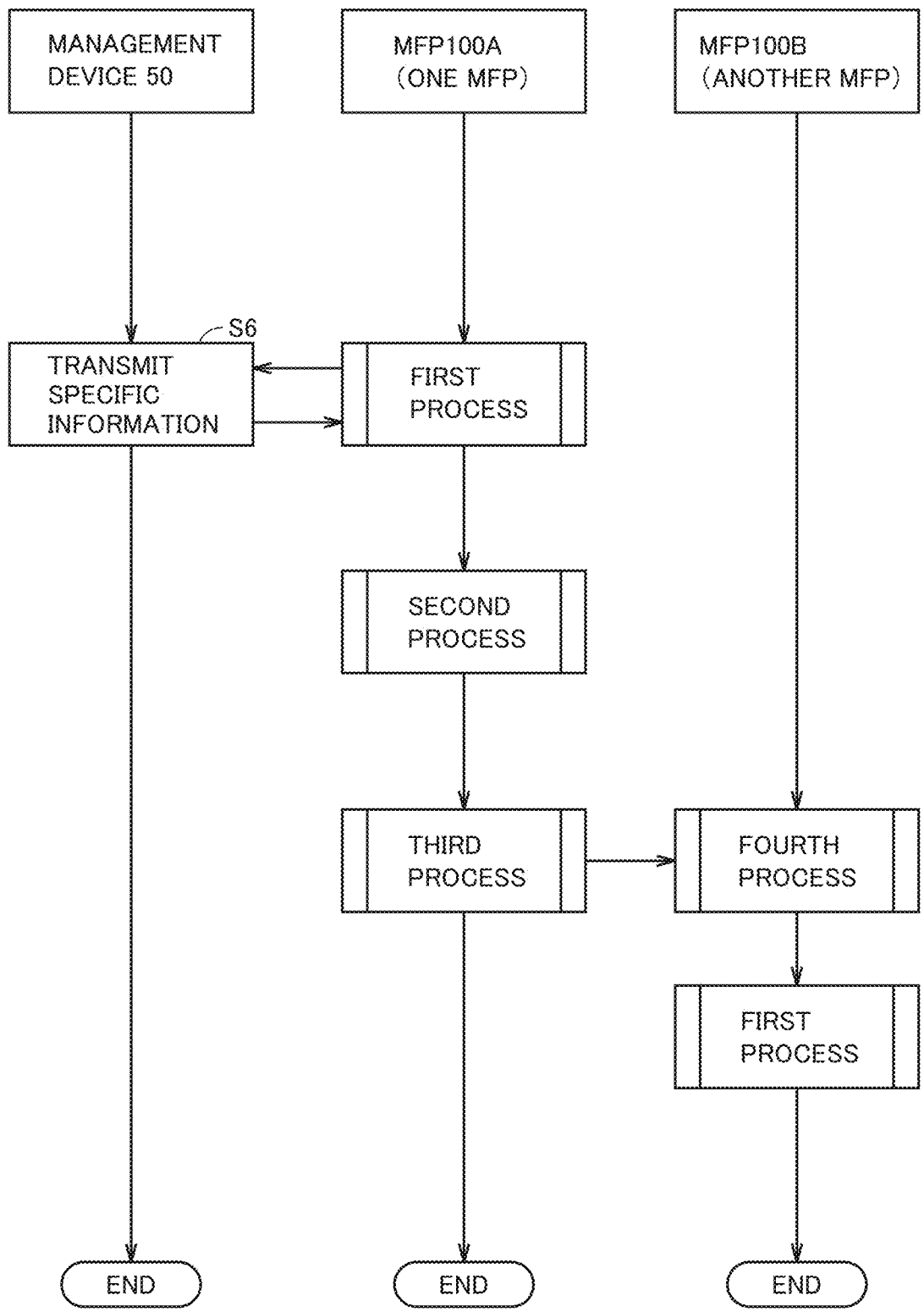
FIG. 23 is a flowchart of an image formation system of another embodiment.

FIG. 23 shows a process flow of image formation system 20. FIG. 23 illustrates processes by management device 50, MFP 100A (one MFP), and MFP 100B (another MFP). Note that FIG. 23 illustrates processes of MFP 100A and MFP 100B. FIG. 23 shows a first process to a fourth process as subroutines.

MFP 100A performs the first process. In the first process, MFP 100A requests specific information (refer to FIG. 3) from management device 50. MFP 100A performs the second process and the third process after the completion of the first process. In the third process, MFP 100A transmits the first command or second command to MFP 100B. MFP 100B performs the fourth process, and if necessary, performs the first process.

Figure 24:
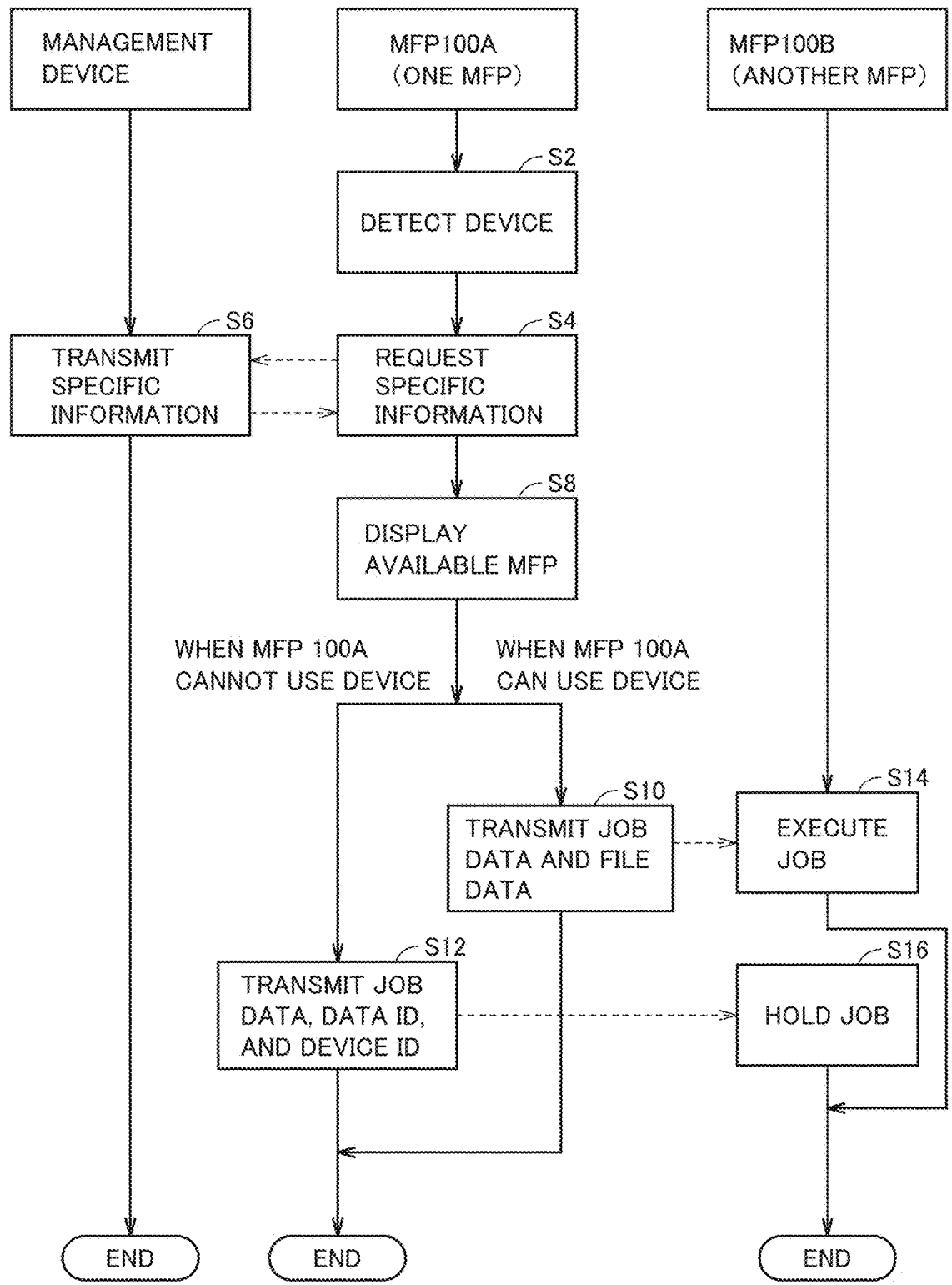
FIG. 24 is a flowchart of the image formation system of the other embodiment.

FIG. 24 shows the processes of FIG. 23 more specifically. At step S2, detection unit 302 of MFP 100A detects a device connected by the user. At step S4, then, control unit 150 requests the specific information shown in FIG. 3 from management device 50. Typically, control unit 150 transmits, to management device 50, a request signal for requesting the specific information shown in FIG. 3. At step S6, then, management device 50 transmits the requested specific information to MFP 100A.

At step S8, then, control unit 150 displays list image 516 (refer to FIGS. 10 and 11) of available MFPs after the completion of the processing of first acquisition unit 304 and the processing of specifying unit 303. The result of the determination of specifying unit 303 is stored in storage unit 318. The result of the determination is used in the processing at step S304 of FIG. 27.

When specifying unit 303 determines that device 200 detected at step S2 can be used in MFP 100A after the completion of the processing of step S8, the process proceeds to step S10. Contrastingly, when specifying unit 303 determines that the device detected at step S2 cannot be used in MFP 100A, the process proceeds to step S12.

In the following, the device determined to be available in MFP 100A is device 200A, and the device determined to be unavailable in MFP 100A is device 200B.

At step S10, control unit 150 transmits the second command to MFP 100B. The second command is a command including job data and file data acquired from device 100A by MFP 100A. Herein, the destination MFP (another MFP) is an MFP selected as an MFP that can use device 200A on the screen of FIG. 10. The present embodiment will provide a description assuming that the other MFP is MFP 100B.

At step S14, when MFP 100B receives the second command transmitted at step S10, MFP 100B acquires the file data included in the second command (file data stored in device 200A). Further, MFP 100B performs the processing defined in the job data included in the command on the file data.

At step S12, control unit 150 acquires no file data from device 200B. This is because device 200B is a device determined to be unavailable in MFP 100B. Control unit 150 instead acquires, from device 200B, the data ID of the file data stored in device 200B and the device ID of device 200B. Further, control unit 150 transmits the acquired data ID, the acquired device ID, and job data to another MFP (MFP 100B) as the first command.

When MFP 100B receives at step S16 the first command transmitted at step S12, MFP 100B holds the job based on the command. Herein, "the processing of holding a job" is processing of causing a storage unit 418 to store the data ID and device ID included in the first command, data indicating the type of processing included in the data command, and the like. The stored data is also referred to as "held job data," and the held job is also referred to as a "held job."

MFP 100A may perform user authentication. MFP 100A stores in advance the user ID of the user who is allowed use. When the user connects device 200 to MFP 100A, MFP 100A displays a user ID acceptance screen (not specifically shown) that accepts an input of the user ID. The user inputs this user ID. A user authentication unit 326 determines whether the input user ID matches the user ID stored in advance. User authentication has succeeded when user authentication unit 326 determines that these IDs match each other, whereas user authentication has failed when user authentication unit 326 determines that the input user ID does not match the stored user ID.

When user authentication succeeds, MFP 100A can start the processing for the connected device. The input user ID is stored in storage unit 318. Also, MFP 100B may perform user authentication. The user authentication by MFP 100B is similar to the user authentication by MFP 100A. The user ID input in MFP 100B is stored in storage unit 418.

At step S10, control unit 150 transmits the user ID stored in storage unit 318 (the user ID input by the user) as the second command, together with the file data and job data.

At step S12, control unit 150 transmits the user ID stored in storage unit 318 (user ID input by the user) as the first command, together with the data. ID, device ID, and job data.

FIG. 29 shows an example held job table of MFP 100B. The held job table stores, for example, data IDs, device IDs, and processing types in correspondence with held job IDs. In FIG. 29, a job of performing printing processing on file data Di is stored in device 200A as a held job with J1 as its held job ID. The held job tables of all MFPs may be stored in management device 50.

The first process to the fourth process will now be described as specific processes of MFP 100. FIGS. 25 to 28 are flowcharts of the first process to the fourth process, respectively. In FIGS. 25 to 28, the processing corresponding to the processing of FIG. 24 is denoted by the same step number as the step number of FIG. 24. The first process to the fourth process are processes performed by MFP 100A and MFP 100B.

At step S2, detection unit 302 of MFP 100A or a detection unit 402 MFP 100B detects device 200. At step S102, next, first acquisition unit 304 or a first acquisition unit 104 acquires the device ID of device 200. Then, control unit 150 or control unit 450 determines whether there is a held job (refer to step S16 of FIG. 24).

For example, in the process of FIG. 24, when MFP 100B performs the processing of step S16 and then performs the processing of step S104, MFP 100B determines YES at step S104. MFP 100B performs the processing of step S104 in the first process after the fourth process of 100B in FIG. 23.

In the process of FIG. 24, when MFP 100A performs the processing of step S104, MFP 100A determines YES at step S104. MFP 100A performs the processing of step S104 in the first process of MFP 100A in FIG. 23.

When control unit 150 determines than there is no held job, the process proceeds to step S106. At step S106, control unit 150 determines whether it has detected a plurality of devices. Herein, "a plurality of devices" are a plurality of devices connected by the user to MFP 100 including a plurality of device IFs 109.

At step S108, display control unit 307 displays a device selection screen. The device selection screen is shown in FIG. 19. Upon a user's input to the screen of FIG. 19, display control unit 307 displays, for example, the screen of FIG. 20.

At step S4, then, control unit 150 requests specific information from management device 50. At step S110, then, specifying unit 303 acquires specific information from management device 50. At step S112, then, by using the specific information, specifying unit 303 specifies an MFP that can use device 200 detected at step S2. Specifying unit 303 causes storage unit 318 to store the result of the specification.

At step S8, then, control unit 150 generates list information on available MFPs based on the device ID acquired at step S102, the result of the specification by specifying unit 303, and the like. Then, display control unit 307 displays a list image of the available MFP(s) based on the list information (refer to FIGS. 10 and 11).

Figure 25:
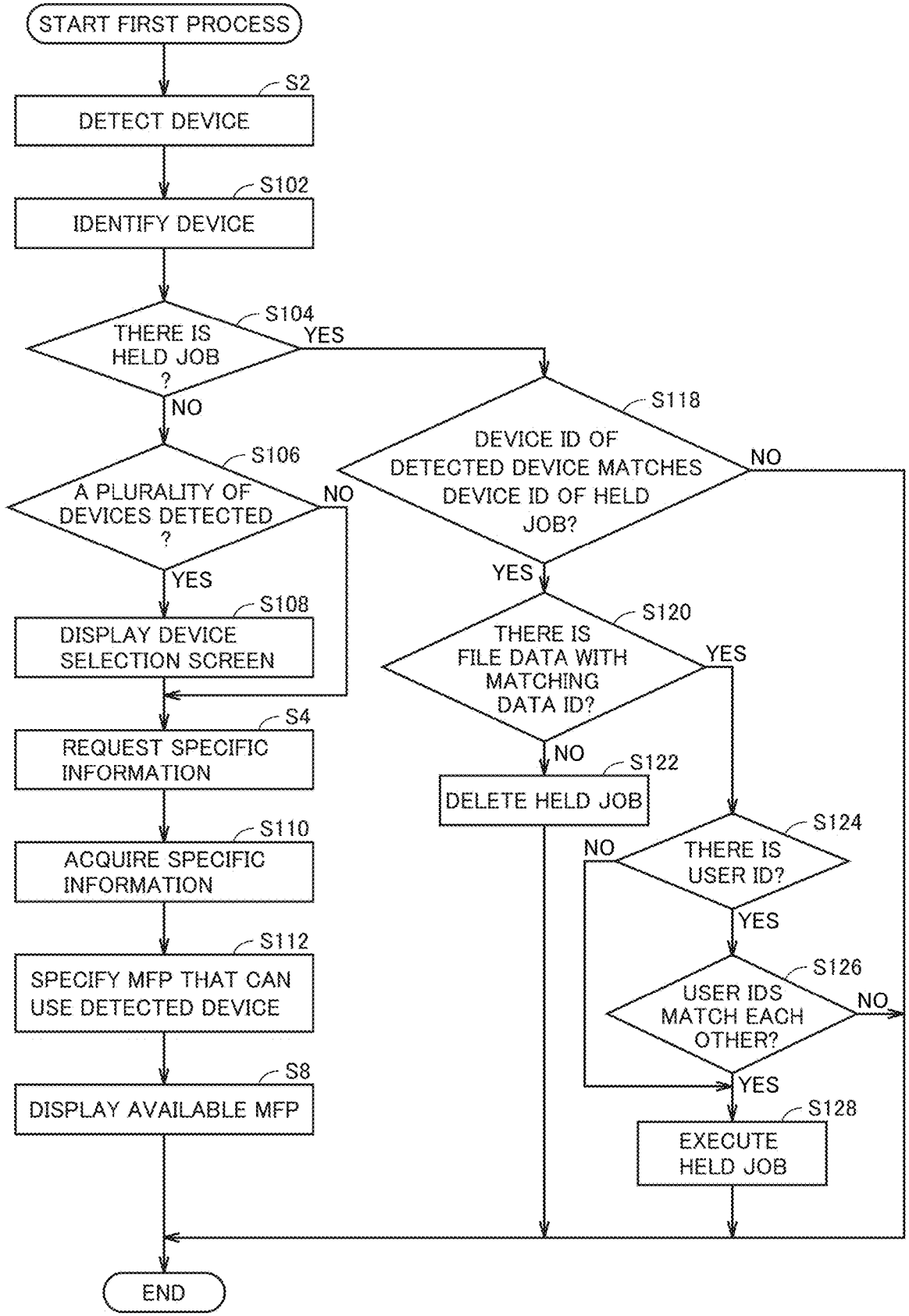
FIG. 25 is a flowchart of the image formation apparatus.

The process of step S2 to step S8 in FIG. 25 corresponds to the process of step S2 to step S8 in FIG. 24.

Contrastingly, when determination is YES at step S104, the process proceeds to step S118. At step S118, control unit 450 determines whether the device ID of the device detected at step S2 matches the device ID brought into correspondence with any held job of one or more held jobs of FIG. 29. When determination is YES at step S118, the process proceeds to step S120. When determination is NO at step S118, the process ends.

At step S120, control unit 450 determines whether the device with the device ID which has been determined to match the device ID of the device at step S118 includes file data with the matching data ID. The processing of step S120 will now be described in detail. At step S120, a second acquisition unit 414 of MFP 100B acquires the data ID of the file data stored in device 200B. At step S16 of FIGS. 24 and 28, control unit 450 acquires the data ID included in the held job data that control unit 450 has caused storage unit 418 to store in the execution of job holding. At step S120, control unit 450 determines whether the data ID of the file data stored in device 200B matches the data ID stored in storage unit 418 (the data ID of the held job).

When determining that both the data IDs match each other, control unit 450 determines YES at step S120. Then, the process proceeds to step S124. Contrastingly, when determining that both the data IDs do not match each other and when determining that file data is not stored in the device connected to MFP 100B, control unit 450 determines NO at step S120, and the process proceeds to step S122.

At step S122, a deletion unit 416 deletes the held job (held job data). At step S124, control unit 450 determines whether the user ID is stored in the detected device 200B. When control unit 450 determines at step S124 that the user ID is stored in device 200B, the process proceeds to step S126.

At step S126, control unit 450 determines whether the user IDs match each other. The processing of step S126 will now be described in detail. MFP 100B performing the processing of step S126 means that the user has connected device 200B to MFP 100B, When MFP 100B detects device 200B, a user authentication unit 426 of MFP 100B displays a user ID acceptance screen. When user authentication unit 426 accepts the user ID from the user ID acceptance screen, user authentication unit 426 causes storage unit 418 to store this user ID.

At step S126, control unit 450 determines whether the user ID stored in device 200B (the user ID input to MFP 100A) and the user ID stored in storage unit 418 (the user ID input to MFP 100B) match each other. When determining that both the user IDs match each other, control unit 450 determines YES at step S126, and the process proceeds to step S128. The determination of YES at step S126 means that, for example, user authentication has succeeded with the identical user ID in both of MFP 100A and MFP 100B. Contrastingly, when determining that both the user IDs do not match each other, control unit 450 determines NO at step S126, and the process of FIG. 25 ends.

At step S128, display control unit 407 displays the screen of FIG. 21 or 22. When the user inputs the execution of a held job on the screen, a processing execution unit 412 executes the held job at step S128. At step S128, processing execution unit 412 typically performs processing on the file data stored in device 200B. Processing execution unit 412 specifies the type of the processing among the types of pieces of processing from the job data included is the first command transmitted at step S12.

Figure 26:
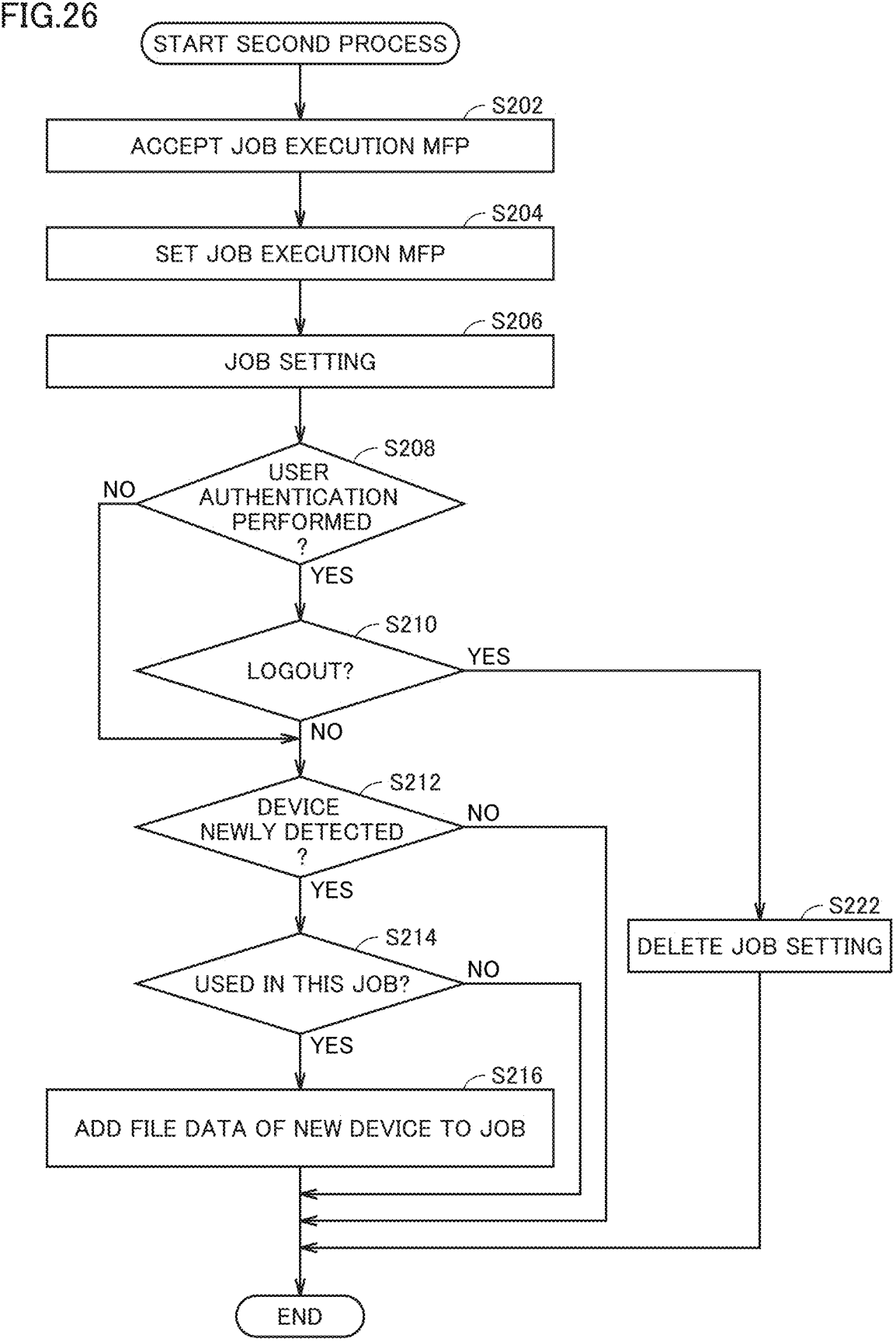
FIG. 26 is a flowchart of the image formation apparatus.

The second process will now be described with reference to FIG. 26. The second process is a process performed after control unit 150 displays list image 516 of available MFP(s)

(refer to FIGS. 10 and 11) at step S8. At step S202, an acceptance unit 308 accepts a user's designation of one or more MFP IDs from list image 516 displayed on display unit 110. For example, in FIGS. 10 and 11, the user checks the checkbox of the displayed MFP ID and touches OK button 508, so that acceptance unit 308 accepts the designation of the checked MFP ID.

At step S204, then, a setting unit 309 sets MFP 100 with the MFP ID accepted at step S202. Typically, setting unit 309 causes storage unit 318 to store an MFP ID, thereby setting the MFP ID.

Then, display control unit 307 displays the screens of FIGS. 12 and 13. The user performs various settings on the screens of FIGS. 12 and 13. At step S206, setting unit 309 performs a job setting based on the settings on the screens of FIGS. 12 and 13. Herein, setting unit 309 causes storage unit 318 to store the setting information input on the screens of FIGS. 12 and 13, thereby performing the job setting. As also described for file selection image 622 of FIG. 13, the job setting includes a user's designation of file data.

At step S208, then, user authentication unit 326 determines, for example, whether user authentication has been performed. When the configuration of image formation system 20 is the configuration in which user authentication unit 326 performs user authentication, for example, user authentication unit 326 performs user authentication after step S2 in FIG. 25. At step S210, then, user authentication unit 326 determines whether a logout from the user authentication has been performed. Herein, a logout condition, which is a condition for logout, includes a condition that a predetermined period of time (e.g., one minute) has elapsed without any operation from a login through user authentication by user authentication unit 326. The logout condition also includes a condition that a logout operation is performed on MFP 100A by the user who has performed a login.

When determination is YES at step S210, the process proceeds to S222. Deletion unit 316 deletes the job setting performed at step S206. Deletion unit 316 typically deletes the information that has been input on the screens of FIGS. 12 and 13 and stored in storage unit 318.

When determination is NO at step S210, the process proceeds to S212. At step S212, detection unit 302 detects whether a new device has been connected. When detection unit 302 detects a new device at step S212 (YES at step S212), the process proceeds to step S211. Contrastingly, when detection unit 302 determines at step S212 that a new device has not been detected (NO at step S212), the process ends.

At step S212, display control unit 307 shows a pop-up display of the screen of FIG. 16. Then, control unit 150 determines whether to process the file data in the new device in the job set at step S206.

For example, when the user designates "NON-USE" in use; non-use image 628 on the screen of FIG. 16, control unit 150 determines NO at step S214. Then, the process ends.

When the user designates "USE" in use/non-use image 628 on the screen of FIG. 16, control unit 150 determines YES at step S214. Then, the process proceeds to step S216.

At step S216, setting unit 309 adds, for example, the file data stored in new device 200 and the setting information input by the user on the screens of FIGS. 12 and 13 to the job set at step S206.

Figure 27:
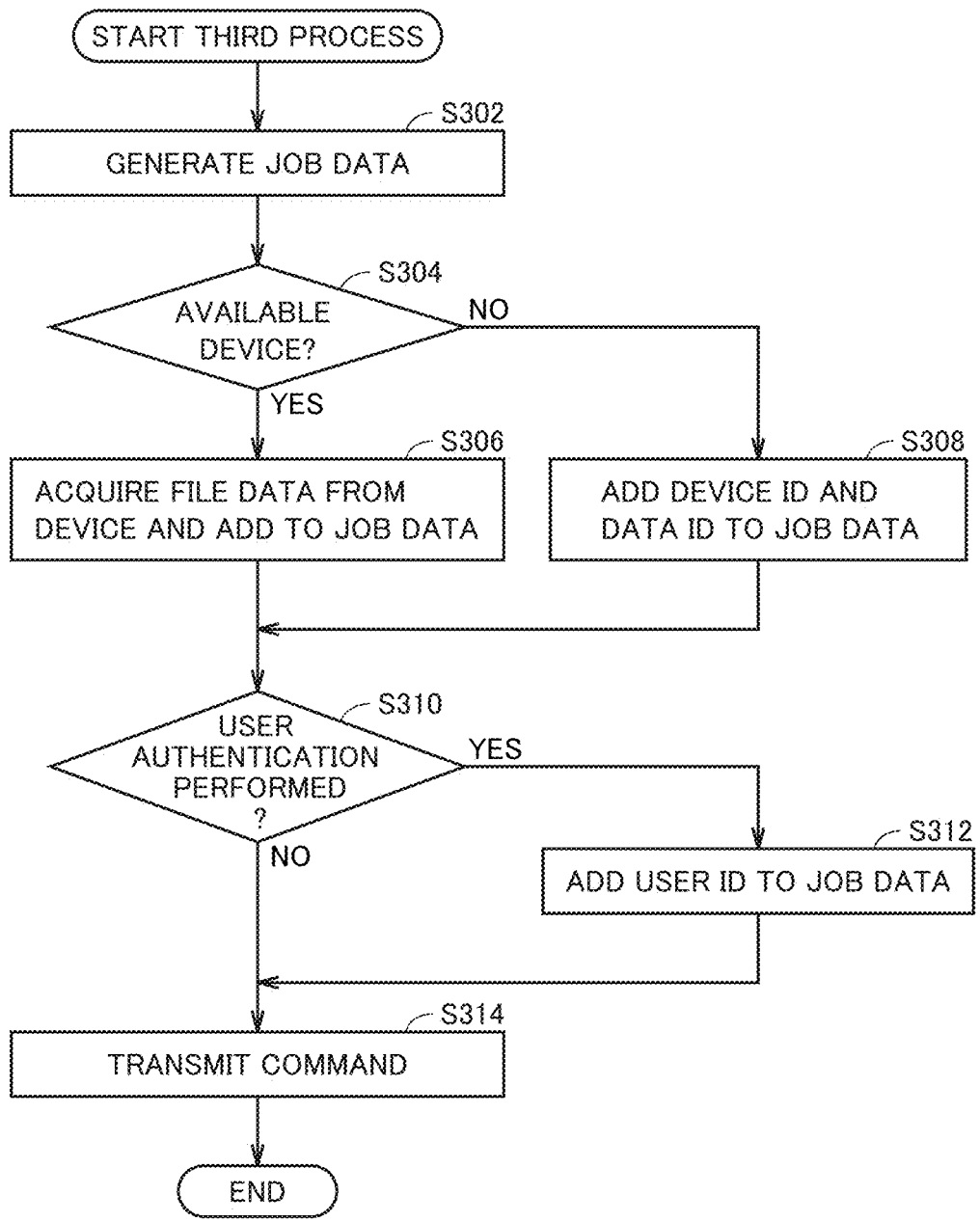
FIG. 27 is a flowchart of the image formation apparatus.

The third process will now be described with reference to FIG. 27. Control unit 150 generates job data at step S302. Control unit 150 generates job data based on, for example, "an address of a destination MFP, a type of processing that the destination MFP is caused to perform, and a printing condition" stored in storage unit 318 at step S204 and step S206.

At step S304, control unit 150 determines whether the device detected at step S2 can be used in MFP 100A. Control unit 150 performs the processing of step S304 based on, for example, the "result of the specification of specifying unit 303" stored at step S112. When the "result of the specification by specifying unit 303" is the result "the device detected at step S2 can be used in MFP 100A," control unit 150 determines YES at step S304. When the "result of the specification by specifying unit 303" is the result "the device detected at step S2 cannot be used in MFP 100A," control unit 150 determines NO at step S304.

When determination is YES at step S304, the process proceeds to step S306. Contrastingly, when determination is NO at step S304, the process proceeds to step S308.

At step S306, control unit 150 acquires file data from device 200 detected at step S2 and adds the file data to the job data, thereby generating a second command. At step S308, control unit 150 also acquires the device ID and data ID from device 200 detected at step S2 and adds them to job data, thereby generating a first command.

At step S310, then, control unit 150 determines whether user authentication has been performed. When control unit 150 determines that user authentication has not been performed (NO at step S310), the process proceeds to step S314. Contrastingly, when control unit 150 determines that user authentication has been performed (YES at step S310), the process proceeds to step S312.

At step S314, for the job data, control unit 150 adds the user ID used in user authentication to the data command. Consequently, the user ID is added to the first command or second command.

At step S314, control unit 150 transmits the command (first command or second command) generated at step S306, step S308, or step S312 from a transmission/reception unit 313 to MFP 100B.

Figure 28:
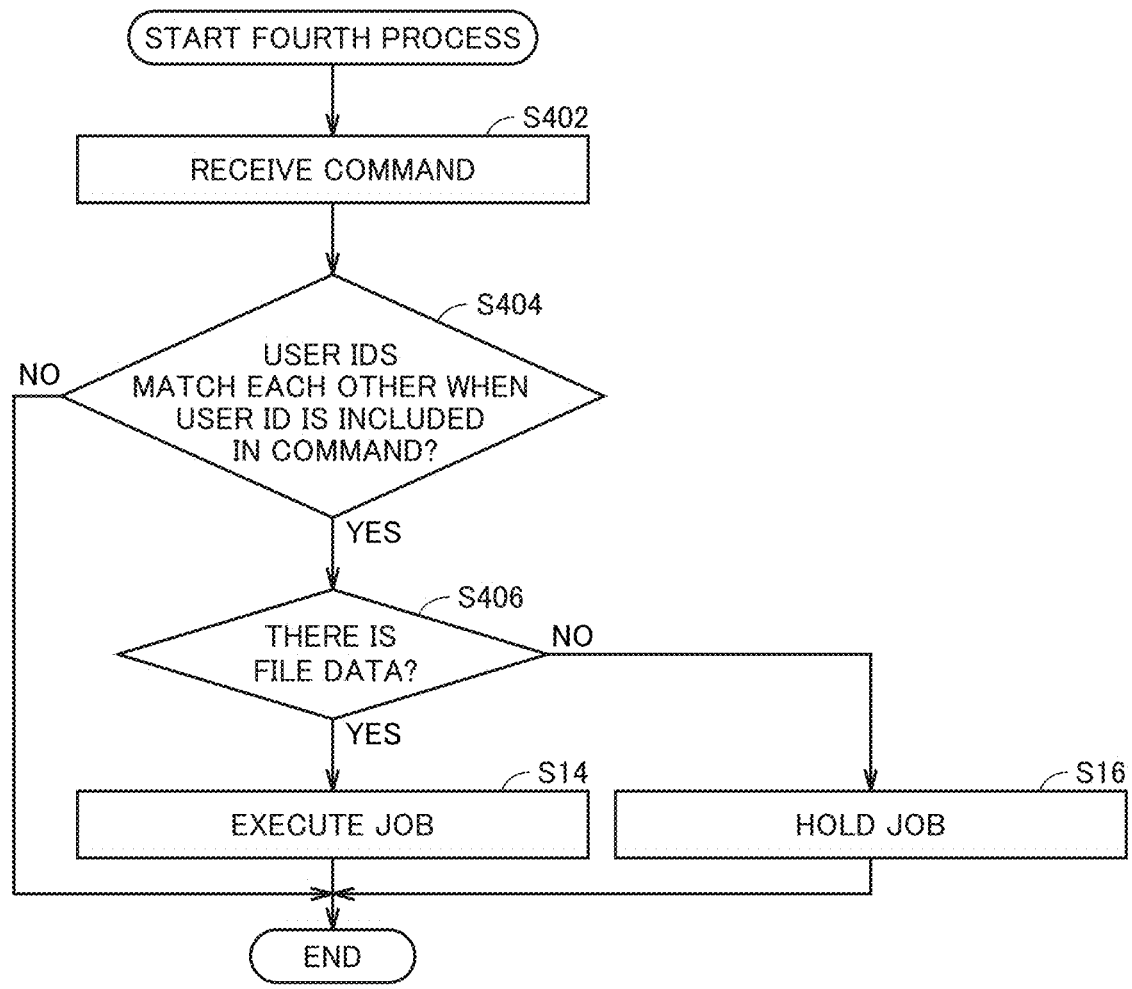
FIG. 28 is a flowchart of the image formation apparatus.

The fourth process will now be described with reference to FIG. 28. As also shown in FIG. 23, the fourth process is a process performed by MFP 100B. The command transmitted at step S314 of FIG. 27 is received by transmission/reception unit 413 of MFP 100B at step S402. Then, the process proceeds to step S404.

At step S404, when the command includes the user ID, user authentication unit 426 determines whether the user ID matches the user ID in the user authentication performed in MFP 100B.

The process ends when determination is NO at step S404. The process proceeds to step S106 when determination is YES at step S404. At step S406, control unit 450 determines whether file data is stored in the command received at step S402. When determination is YES at step S406, the process proceeds to step S14. Contrastingly, when determination is NO at step S406, the process proceeds to step S16.

At step S14, processing execution unit 412 acquires file data from device 200 and performs the process on the file data. At step S16, control unit 450 holds the job.

Effects Achieved by Image Formation System and Image Formation Apparatus

The effects achieved by the image formation system and the image formation apparatus of the present embodiment will now be described.

(1) At step S2 of FIG. 25, detection unit 302 detects device 200. At step S102, then, first acquisition unit 304 acquires the device ID of the detected device 200. At step S112, then, by using the specific information, specifying unit 303 specifies an MFP that can use the detected device. Then, display unit 110 displays the respective MFP IDs of the one or more MFPs specified by specifying unit 303, as shown in FIG. 10 or 11.

Thus, as display unit 110 displays the screen of FIG. 10 or 11, the image formation system of the present embodiment allows the user to easily recognize an MFP that can use device 200. In particular, even when it is determined that the device connected to an MFP by the user cannot be used in the MFP, display of the screen of FIG. 11 by display unit 110 can allow the user to recognize another MFP that can use this device without imposing a burden on the user.

(2) At step S202, acceptance unit 308 accepts the user's designation of one or more MFP IDs (MFP 100B in the present embodiment) from list image 516 (refer to FIGS. 10 and 11) displayed on display unit 110. The designated MFP 100B is an MFP that performs processing on the file data in the connected device. At step S206, setting unit 309 of MFP 100A performs a job setting based on the settings performed on the screens of FIGS. 12 and 13. At step S314, transmission/reception unit 313 transmits a command (first command or second command) corresponding to the job setting to MFP 100B. MFP 100B is an MFP 100 accepted by acceptance unit 308 at step S202. Further, processing execution unit 412 of MFP 100B performs the processing on data at step S14 or step S128 based on the transmitted command.

Even when, for example, it is determined that in MFP 200A connected with a device, the device cannot be used, thus, MFP 2003 is allowed to perform the processing on the file data stored in the device.

(3) When it is determined at step S112 (step S304) that specifying unit 303 determines the device detected by MFP 100A can be used in MFP 100A, transmission/reception unit 313 transmits the second command including the file data acquired from the device (refer to step S306) to MFP 100B. Processing execution unit 412 of MFP 100B performs the processing on the file data included in the second command. Thus, when it is determined that the detected device can be used in MFP 100A, the processing on the file data can be performed appropriately in MFP 100B designated by the user.

For example, in the second situation (refers to FIG. 8), the user connects device 200A to MFP 100A to display the image of FIG. 10. Referring to the image of FIG. 10, the user designates MFP 100A and MP 100B as the MFPs that the user causes to perform processing. Then, the user selects the processing of adding an image "confidential document" through the operation of advanced selling button 626 on the printing setting screen of MFP 100A which is shown in FIG. 13 and the printing setting screen of MFP 100B which is shown in FIG. 13. Consequently, in the second situation, the user can perform a setting of performing image processing (processing of adding the image "confidential document") in MFP 100A and can reflect this setting on both of MFP 100A and MFP 100B. The burden on the user can thus be reduced in the second situation.

(4) When specifying unit 303 determines that the device detected in MFP 100A cannot be used (is unavailable) in MFP 100A at step S112 (step S304), transmission/reception unit 313 transmits the first command (refer to step S308) including the data ID acquired from the device to MFP 100B. At step S2 in the first process after the fourth process of FIG. 23, when detection unit 402 of MFP 100B detects the connection of device 200, at step S120, second acquisition unit 414 acquires the data ID of the file data stored in device 200B from device 200B. At step S128, then, processing execution unit 412 performs the processing on the data with the data ID matching the acquired data ID among the pieces of data ID stored in storage unit 418 at step S16. Even when it is determined that the detected device cannot be used in MFP 100A, thus, MFP 100B designated by the user can be caused to appropriately perform the processing on file data.

For example, in the first situation, at step S206, the user can designate file data a stored in MFP 100A from the screen of FIG. 13 and also can set the printing condition. Also for the designation of file data a and the printing condition of file data a, setting unit 309 sets these as jobs, (includes these in the job). Thus, MFP 100A transmits file data a to MFP 100B. Then, the user can connect device 200A to MFP 100B to allow MFP 100B to perform printing based on the integrated data having integration of file data a and file data b. The burden on the user can thus be reduced in the first situation.

(5) The first command also includes a device ID in addition to the data ID (refer to step S308). At step S118, it is determined whether the device ID of the device detected at step S2 matches the device ID brought into correspondence with any held job of one or more held jobs of FIG. 29. When determination is YES at step S118, processing execution unit 412 performs a held job at step S128. Contrastingly, when determination is NO at step S118, since the processing of step S128 is not performed, processing execution unit 412 does not preform the held job. Thus, even when, for example, another device is mistakenly connected to MFP 100B though device 200B should be connected to MFP 100B in the first situation, the execution of processing on the file data stored in the other device can be prevented.

(6) In the first situation, when the user who has visually recognized the screen of FIG. 14 connects device 200B to MFP 100B, display unit 410 may display the screen of FIG. 22 through the control of display control unit 407. In FIG. 25, for example, when determination is YES at step S104, the screen of FIG. 22 is displayed before the execution of the processing of step S118. That is to say, the screen of FIG. 22 is displayed before the execution of the held job of step S128. The list of held jobs is shown in held job image 652 on the screen of FIG. 22. Acceptance unit 408 accepts designation of at least one of the setting change through the operation on setting change button 658, the deletion through the operation on delete button 660, and the execution of the operation on execute button 662, for one or more held jobs shown in held job image 652. Thus, the user can perform various pieces of processing for a held job, leading to improvements in user's convenience.

(7) On the screen of FIG. 22, a list of held jobs (held job image 654) is shown also for MFP 100C different from both of MFP 100A (first MFP) and MFP 100B (second MFP). The user can thus also recognize a held job for MFP 100C. In FIG. 22, when there are a plurality of MFPs different from both of MFP 100A (first MFP) and MFP 100B (second MFP), display control unit 407 may display a held job for each of the plurality of MFPs.

(8) Deletion unit 416 of MFP 100B deletes the held job when a predetermined condition is satisfied. The storage capacity of storage unit 418 of MFP 100B can accordingly be reduced, leading to improvements in the storage capacity for a held job.

(9) When data identified by a data ID cannot be acquired from the device, for example, when it is determined at step S120 that the device has no file data (NO at step S120), the held job of the device which has been determined YES at step S118 is deleted. This is based on a fact that the held job is presumably inexecutable. This can reduce the storage capacity of storage unit 418 of MFP 100B, leading to improvements in the storage capacity for a held job by the held job.

(10) Transmission/reception unit 313 of MFP 100A can transmit commands (a first command and a second command) to MFP 100B via network 40. This allows transmission/reception unit 313 to, for example, transmit the command to MFP 100B without imposing a burden on the user.

(11) Display unit 110 displays the respective MFP IDs of two or more MFPs specified by specifying unit 303. For example, display unit 110 displays the screen of FIG. 10. Acceptance unit 308 can accept user's designation of a plurality of MFP IDs among the two or more MFP IDs displayed by display unit 110 on the screen of FIG. 10. Further, for the plurality of MFPs designated by the user, the user can perform the processing setting on the screen of FIG. 13 in the MFP connected with device 200 by the user. Thus, the user's convenience can be improved.

In a modification, when the user designates two or more MFPs on the screen of FIG. 10 or the screen of FIG. 11, a screen (not specifically shown) for causing the user to input whether "the identical processing setting is performed on the two or more MFPs" or "a different processing setting is individually performed on the two or more MFPs" may be displayed. An entry "the identical processing setting is performed on the two or more MFPs" and an entry "a different processing setting is individually performed on the two or more MFPs" are displayed on this screen.

When the user selects the entry "the identical processing setting is performed on the two or more MFPs," the screen of FIG. 13 for performing the identical processing setting on the two or more MFPs is displayed. Contrastingly, when the user selects "a different processing setting is individually performed on the two or more MFPs," the screen of FIG. 13 for each of the two or more MFPs is displayed.

(12) Detection unit 302 of an MFP (e.g., MFP 100A) including a plurality of device IFs 109 can detect connections of a plurality of devices. As shown in FIG. 19, display unit 110 displays the device ID of each of the plurality of devices detected by detection unit 302. Acceptance unit 308 accepts the user's designation of a plurality of device IDs displayed by display unit 110. Further, the user performs processing setting on each of the plurality of devices on the screen of FIG. 20, the screen of FIG. 17, or the screen of FIG. 18. In an MFP connected with a plurality of devices by a user, the user can set which MFP is caused to process the file data stored in each of the plurality of devices. Thus, user's convenience can be improved.

For example, in the third situation shown in FIG. 9, for example, both of device 200A and device 200C can be connected to MFP 100A to reflect a setting of performing image processing in MFP 100A on both of MFP 100A and MFP 100C. Further, the user can determine an MFP, which is caused to process file data a stored in device 200A, and an MFP, which is caused to perform file data c stored in device 200C. This can reduce the burden on the user in the third situation.

(13) Display unit 110 displays a plurality of device IDs as shown in FIG. 19. Acceptance unit 308 accepts the user's designation of a plurality of displayed device IDs. When acceptance unit 308 accepts a plurality of device IDs, display control unit 307 displays the screen of FIG. 20. MFP setting image 526 is displayed on the screen of FIG. 20, where MFP selling image 526 is displayed for causing the user to make a selection from the following: the user designates an MFP for each of the devices having a corresponding one of the device IDs, destination of which has been accepted; the user causes a common MFP to perform processing on the file data stored in each of the devices having a corresponding one of the plurality of device IDs; and the user causes different MFPs to perform processing. MFP setting image 526 is an image for causing the user to select whether to cause different MFPs to individually perform the pieces of file data stored in the devices each having a corresponding one of a plurality of device IDs or to cause the identical MFP to perform pieces of file data stored in devices each having a corresponding one of a plurality of device IDs. User's convenience can be improved by display of MFP setting image 526.

(14) In some cases, one device is connected to an MFP, and a new device is connected during a job setting of file data in the one device. In such cases, display unit 110 displays the screen of FIG. 16 as a pop-up image. Use/non-use image 628 is displayed, which is provided for causing the user to select whether to determine the file data stored in the new device as a target of the job setting being performed. User's convenience can be improved by display of use/non-use image 628.

(15) When a login is performed with the identical user ID in MFP 100A (first MFP) and MFP 100B (second MFP), processing execution unit 412 of MFP 100B performs the processing on the file data stored in the device based on a command. In the present embodiment, it is determined at step S310 of FIG. 27 whether user authentication has been performed for MFP 100A, and when it is determined that the user authentication has been performed, a user ID is added to the job data at step S312.

Further, it is determined at step S404 of FIG. 8 whether the user ID input in user authentication performed in MFP 100B matches the user ID added at step S312. A job is executed or held when it is determined that both the user IDs match each other, and the process ends without executing or holding a job when it is determined that both the user IDs do not match each other. Thus, even when the user who has connected the device to MFP 100A differs from the user who has connected the device to MFP 100B, MFP 100B can be caused not to perform processing on the file data in the connected device. This can improve the security of image formation system 20.

(16) In the present embodiment, specific information is possessed by management device 50. An MFP, the device of which has been detected, requests the specific information from management device 50 at, for example, step S4 of FIG. 24. Management device 50 transmits the specific information to a source MFP. Thus, the relationship between the device and MFP can be managed in a centralized manner. This can improve the security of the image formation system.

(17) When, for example, minting is performed with a confidential code added to the header of file data a of device 200A, the confidential code may leak if this setting is passed to another user and is available, causing a security issue. At step S208, step S210, and step S222 of FIG. 26, thus, when user authentication has been performed but a logout has been performed for the user authentication, MFP 100 deletes the job setting at the time of the user authentication. This can provide improved security.

Modifications

The present invention is not limited to the above embodiment and can be modified and applied in various manners. Modifications applicable to the present invention will now be described.

(1) Another example of the delete condition (predetermined condition) on which deletion unit 416 deletes a job will be described. The delete condition may be set to include a condition that a period during which the processing on data included in the job is not performed by processing execution unit 412 reaches a predetermined period. That is to say, for example, when the predetermined period has elapsed from holding of a job by MFP 100B, deletion unit 416 of MFP 100B deletes the held job. The predetermined period may be any period. The predetermined period may be, for example, a week. Even such a configuration can reduce the storage capacity of storage unit 418 of MFP 100B, leading to improvements in the storage efficiency for the held job.

(2) Another example of the delete condition will now be described. FIG. 30 is a diagram for illustrating another example of the delete condition. As also described with reference to FIG. 3, the specific information is information in which one or more available devices are determined for each of a plurality of MFPs. The specific information can be changed by, for example, an administrator, so that the security desired by the administrator can be achieved.

In the embodiment described above, MFP 100B holds a job. Herein, when the specific information stored in management device 50 is changed by the administrator or the like, the changed specific information may be transmitted to each MFP of image formation system 20.

For example, it is determined in the example of FIG. 3 that device 200B can be used for MFP 100B. As shown in FIG. 29, thus, the job of device 200B is held in held job J2. Then, the administrator defines that device 200B cannot be used in MFP 100B as shown in FIG. 30. In this case, the specific information is transmitted to each MFP. A third acquisition unit 420 acquires the specific information. Control unit 450 of MFP 100B which has acquired the specific information recognizes that device 200B cannot be used in MFP 100B. At the same time, control unit 450 recognizes that held job J2 using device 200B cannot be performed. Consequently, deletion unit 416 of MFP 100B deletes job J2. That is to say, the delete condition includes a condition determining that device 200B cannot be used with reference to the specific information acquired by third acquisition unit 420. In other words, deletion unit 416 deletes the held job of performing processing on file data stored in the device that cannot be used with reference to the specific information acquired by third acquisition unit 420. Such a configuration can prevent a situation in which an inexecutable held job will be stored indefinitely, leading to reduced storage capacity of storage unit 418 of MFP 100B. Consequently, the storage capacity for a held job can be improved.

(3) It is assumed here that MFP 100A is not connected to network 40. In this case, MFP 100A cannot communicate with another MFP. It is assumed here that in such an image formation system, for example, in the first situation (refer to FIG. 7), the user intends to cause MFP 100B to perform processing based on the integrated data having integration of file data b stored in device 200B and file data a stored in MFP 100A (e.g., printing processing for the integrated data).

In this case, when, for example, the user connects device 200B (the device that cannot be used in MVP 100A) to MFP 100A, MFP 100A displays the screen of FIG. 10. In FIG. 10, the user designates an MFP that the user intends to cause to perform processing. Herein, the user has designated MFP 100B as the MFP that the user intends to cause to perform processing. When the user specifies MFP 100B, MFP 100A causes device 200B to store the MFP ID of MFP 100B.

Then, MFP 100A also causes device 200B to store the setting information input on the screens of FIGS. 12 and 13 as job data.

Then, the user connects device 200B to MFP 100B. A fourth acquisition unit 424 of control unit 450 of MFP 100B acquires job data and an MFP ID from device 200B. Control unit 450 compares the acquired MFP ID with the MFP ID of the MFP (MFP 100B) including control unit 450. When determining through the comparison that both the MFP IDs match each other, MFP 100B determines that a correct device is connected to MFP 100B and performs processing based on the file data and setting information (job data) stored is the device. Contrastingly, when it is determined through the comparison that both the MFP IDs do not match each other, MFP 100B does not perform tins processing.

As described above, in the present modification, the user can also cause MFP 100B that cannot communicate with MFP 100A, to which the user has connected a device, to perform processing. This can improve user's convenience.

In yet another modification of the present modification, an MFP ID may be transmitted to management device 50, in place of causing device 200 to store the MFP ID. In this case, management device 50 stores the transmitted MFP ID. Then, MFP 200B connected with the device requests the MFP ID from management device 50. MFP 100B compares the requested MFP ID with the MFP ID of MFP 100B. When determining through the comparison that both the MFP IDs match each other, MFP 100B determines that a correct device is connected to MFP 100B, and performs processing based on the file data and setting information stored in the device. Contrastingly, when determining through the comparison that both the MFP IDs do not match each other, MFP 100B does not perform this processing.

Figure 31:
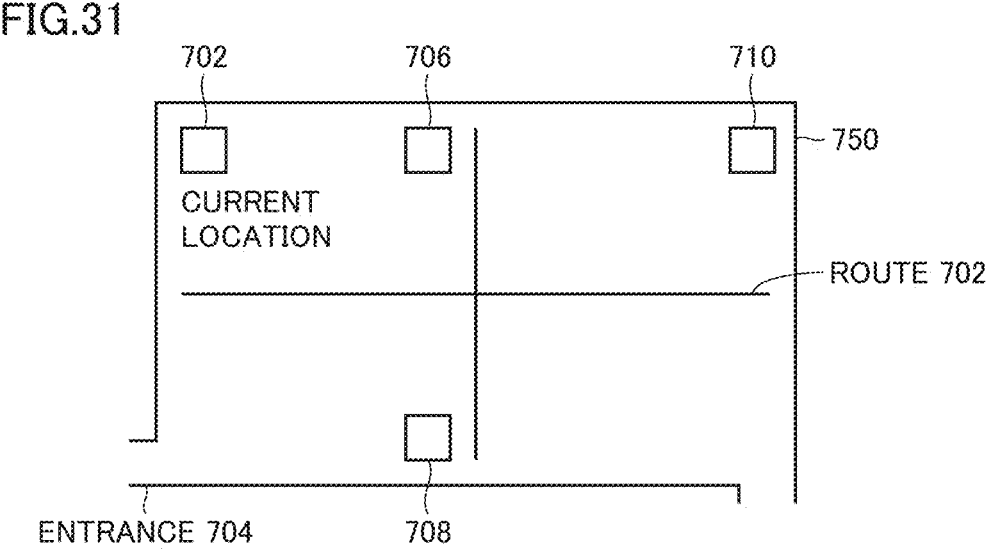
FIG. 31 shows an example display screen in another embodiment.

(4) Modifications of the display mode of the screens of FIGS. 5, 10, and 11 will now be described. FIG. 31 shows a first display mode. As shown in FIG. 31, the first display mode is a mode in which map information 750 is displayed that shows the respective positions of one or more image formation apparatuses. The example of FIG. 31 shows, as map information, information on, for example, a room in which an MFP connected with a device is provided. A route image 702 and an entrance image 704 are shown as room information.

In the example of FIG. 31, words "current locations" are displayed for an MFP connected with a device, and marks 706, 708, and 710 are displayed as pieces of identification information of MFPs that can use this device. Such a configuration can allow even a user who does not know an MFP ID to intuitively recognize the position of an MFP that can use a device by visually recognizing map information 750 (map image).

(5) A second display mode will now be described. The example of FIGS. 5, 10, and 11 has been described assuming that MFP IDs are displayed in accordance with the degree of priority corresponding to the closeness to an MFP connected with a device. In the second display mode, for a user ID input in the user authentication of MFP 100A, MFP IDs are displayed in accordance with the degree of priority corresponding to the usage frequency.

For example, MFP 100A holds a usage frequency database shown ins FIG. 32. In the example of FIG. 32, the usage frequency (e.g., the number of usage) of each MFP is defined per user ID. For example, it is defined that for a user ID "U1", MFP 100A is used A1 times, MFP 100B is used 91 times, and MFP 100C is used C1 times. This database is managed by, for example, management device 50 in a centralized manner. When each MFP is used, this MFP transmits the information on its use to management device 50. This use refers to that, for example, "an MFP is caused to perform processing." The processing is, for example, at least one piece of processing among various pieces of processing described above (e.g., printing processing, scanning processing).

Upon receipt of the information on the use of the MFP, management device 50 updates the usage frequency database shown in FIG. 32 based on this information. Additionally, management device 50 transmits the updated usage frequency database to each MFP. Each MFP updates the usage frequency database stored in this MFP to the transmitted usage frequency database (updated usage frequency database).

When device 200 is connected to MFP 100A, user authentication unit 326 performs user authentication to cause the user to input the user ID. Further, specifying unit 303 specifies an MFP that can use device 200 based on the specific information. Display control unit 307 determines, based on the usage frequency database shown in FIG. 32, a usage frequency of the MFP that can use device 200 with the user ID input in the user authentication. Then, display control unit 307 displays MFP IDs in accordance with the degree of priority corresponding to the usage frequency of the MFP that can use device 200 with the user ID input in the user authentication. For example, display unit 110 displays MFP IDs of MFPs which have been used frequently for the input user ID in order from the top (refer to FIG. 5).

Thus, the user who has connected a device can recognize an MFP that can use this device and, has been frequently used by the user. Consequently, user's convenience can be improved.

(6) The above embodiment has provided a description assuming that specific information is held by management device 50. However, the specific information may be held by at least one of a plurality MFPs. The MFP that has specific information will be referred to as a "specific MFP" below.

In this case, at step S4, MFP 100A requests specific information from the specific MFP. The specific MFP transmits specific information to a source MFP. When the MFP that has requested specific information and the specific MFP are not connected to each other through a network. MFP 100A may transmit a request signal to specific MFP via management device 50. In this case, the specific MFP transmits specific information to MFP 100A via management device 50.

Such a configuration can cause not management device 50 but the MFP to hold the specific information. Consequently, the processing load of management device 50 can be reduced.

As described above, the present embodiment includes the following disclosure.

Feature 1

An image formation system comprising a plurality of image formation apparatuses, wherein
a first image formation apparatus among the plurality of image formation apparatuses includes a controller and a display,
the controller
detects a connection of an external device,
acquires identification information of the detected external device, and
specifies, by using specific information, one or more image formation apparatuses capable of using the detected external device among the plurality of image formation apparatuses, and
the display displays identification information of each of the specified one or more image formation apparatuses.

Feature 2

The image formation system according to feature 1, wherein
the controller of the first image formation apparatus
accepts a user's designation of the identification information of each of the specified one or more image formation apparatuses which is displayed by the display,
performs a job setting including designation of data stored in the external device, and
when an image formation apparatus with the identification information designated by a user is a second image formation apparatus different from the first image formation apparatus, transmits a command corresponding to the job setting to the second image formation apparatus, and
a controller of the second image formation apparatus performs processing on the data based on the command.

Feature 3

The image formation system according to feature 2, wherein
when it is determined that the external device detected by the controller of the first image formation apparatus is available in the first image formation apparatus, the controller of the first image formation apparatus transmits the command including the data designated by the job setting to the second image formation apparatus designated by the user, and
the controller of the second image formation apparatus performs processing on the data included in the command.

Feature 4

The image formation system according to feature 2, wherein
when it is determined that the external device detected by the controller of the first image formation apparatus is unavailable in the first image formation apparatus, the controller of the first image formation apparatus transmits the command including data identification information of the data designated by the job setting to the second image formation apparatus designated by the user, and
when the second image formation apparatus detects a connection of an external device, the controller of the second image formation apparatus acquires the data identified by the data identification information from the external device and performs processing on the acquired data.

Feature 5

The image formation system according to feature 4, wherein
the command includes identification information of an external device determined to be unavailable in the first image formation apparatus, and
when the second image formation apparatus detects a connection of an external device identified by the identification information, the controller of the second image formation apparatus performs processing on the data identified by the data identification information.

Feature 6

The image formation system according to feature 4, wherein
the second image formation apparatus further includes a display that displays, when the second image formation apparatus detects a connection of an external device, before performing processing on the data identified by the data identification information, a list of jobs including the data, processing of each of the jobs being held, and
for a job of the jobs of the list, the controller of the second image formation apparatus accepts designation of at least one of execution of processing on the job, deletion of the job, and change of setting of the job.

Feature 7

The image formation system according to feature 6, wherein for one or more image formation apparatuses different from both of the first image formation apparatus and the second image formation apparatus, the display of the second image formation apparatus displays a list of jobs, processing of each of the jobs being held.

Feature 8

The image formation system according to feature 4, wherein when a predetermined condition is satisfied, the controller of the second image formation apparatus deletes a job including the data, processing of each of the jobs being held.

Feature 9

The image formation system according to feature 8, wherein the predetermined condition includes a condition that the data identified by the data identification information is unattainable from an external device.

Feature 10

The image formation system according to feature 8, wherein the predetermined condition includes a condition that a period in which processing on the data identified by the data identification information is not performed by the controller of the second image formation apparatus reaches a predetermined period.

Feature 11

The image formation system according to feature 8, wherein the specific information is information in which an available external device is determined for each of the plurality of image formation apparatuses,
at least one of the plurality of image formation apparatuses newly acquires the specific information, and
the predetermined condition includes a condition that an external device is unavailable based on the acquired specific information.

Feature 12

The image formation system according to feature 2, wherein the controller of the first image formation apparatus transmits a command corresponding to the job setting via a network to the second image formation apparatus designated by the user.

Feature 13

The image formation system according to feature 2, wherein
the controller of the first image formation apparatus stores the data and job data in an external device, and
the controller of the second image formation apparatus acquires the data and the job data stored in the external device and performs processing on the acquired data based on the acquired job data.

Feature 14

The image formation system according to feature 2, wherein
the display of the first image formation apparatus displays identification information of each of two or more image formation apparatuses specified by the controller of the first image formation apparatus, and
the controller of the first image formation apparatus is capable of accepting a user's designation of a plurality of pieces of identification information among two or more pieces of the identification information displayed by the display of the first image formation apparatus.

Feature 15

The image formation system according to feature 2, wherein
the controller of the first image formation apparatus is capable of detecting connections of a plurality of external devices,
the display of the first image formation apparatus displays identification information of each of the plurality of external devices detected by the controller of the first image formation apparatus,
the controller of the first image formation apparatus accepts a user's designation of a plurality of pieces of the identification information displayed by the display of the first image formation apparatus, and
the controller of the second image formation apparatus performs processing on data stored in an external device with the identification information designated by the user.

Feature 16

The image formation system according to feature 2, wherein when accepting a user's designation of a plurality of pieces of identification information displayed by the display of the first image formation apparatus, the display of the first image formation apparatus displays an image for causing the user to select to
cause a different image formation apparatus to perform processing for each external device with a corresponding one of the plurality of pieces of identification information, designation of each of the plurality of pieces of identification information being accepted, or
cause an identical image formation apparatus to perform processing for each external device with a corresponding one of the plurality of pieces of identification information.

Feature 17

The image formation system according to feature 2, wherein when the controller of the first image formation apparatus detects a connection of a new external device during the job setting, the display of the first image formation apparatus displays an image for causing the user to select whether to determine data stored in the new external device as a target of the job setting being performed.

Feature 18

The image formation system according to feature 2, wherein when a login is performed with an identical user ID in the first image formation apparatus and the second image formation apparatus, the controller of the second image formation apparatus performs processing on the data based on the command.

Feature 19

The image formation system according to feature 1, wherein the display of the first image formation apparatus displays identification information of the specified one or more image formation apparatuses in accordance with a degree of priority corresponding to closeness to the image formation apparatus that has detected a connection of an external device for each of the specified one or more image formation apparatuses.

Feature 20

The image formation system according to feature 1, wherein the display of the first image formation apparatus displays
identification information of each of one or more other image formation apparatuses, and
map information showing respective positions of the one or more other image formation apparatuses.

Feature 21

The image formation system according to feature 1, wherein for a user ID input in user authentication of the first image formation apparatus, the display of the first image formation apparatus displays identification information of the specified one or more image formation apparatuses in accordance with a degree of priority corresponding to a usage frequency for each of the specified one or more image formation apparatuses.

Feature 22

The image formation system according to feature 1, wherein the specific information is information transmitted from a management device.

Feature 23

The image formation system according to feature 1, wherein the specific information is information possessed by one image formation apparatus of the plurality of image formation apparatuses.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image formation system comprising a plurality of image formation apparatuses, wherein
a first image formation apparatus among the plurality of image formation apparatuses includes a controller and a display,
the controller
detects a connection of an external device,
acquires identification information of the detected external device, and
specifies, by using specific information, one or more image formation apparatuses capable of using the detected external device among the plurality of image formation apparatuses,
displays identification information of each of the specified one or more image formation apparatuses on the display,
accepts a user's designation of the identification information of each of the specified one or more image formation apparatuses which is displayed by the display,
performs a job setting including designation of data stored in the external device,
when an image formation apparatus with the identification information designated by a user is a second image formation apparatus different from the first image formation apparatus, transmits a command corresponding to the job setting to the second image formation apparatus, and
a controller of the second image formation apparatus performs processing on the data based on the command.

2. The image formation system according to claim 1, wherein
when it is determined that the external device detected by the controller of the first image formation apparatus is available in the first image formation apparatus, the controller of the first image formation apparatus transmits the command including the data designated by the job setting to the second image formation apparatus designated by the user, and
the controller of the second image formation apparatus performs processing on the data included in the command.

3. The image formation system according to claim 1, wherein
when it is determined that the external device detected by the controller of the first image formation apparatus is unavailable in the first image formation apparatus, the controller of the first image formation apparatus transmits the command including data identification information of the data designated by the job setting to the second image formation apparatus designated by the user, and
when the second image formation apparatus detects a connection of an external device, the controller of the second image formation apparatus acquires the data identified by the data identification information from the external device and performs processing on the acquired data.

4. The image formation system according to claim 3, wherein
the command includes identification information of an external device determined to be unavailable in the first image formation apparatus, and
when the second image let nation apparatus detects a connection of an external device identified by the identification information, the controller of the second image formation apparatus performs processing on the data, identified by the data, identification information.

5. The image formation system according to claim 3, wherein
the second image formation apparatus further includes a display that displays, when the second image formation apparatus detects a connection of an external device, before performing processing on the data identified by the data identification information, a list of jobs including the data, processing of each of the jobs being held, and
for a job of the jobs of the list, the controller of the second image formation apparatus accepts designation of at least one of execution of processing on the job, deletion of the job, and change of setting of the job.

6. The image formation system according to claim 5, wherein for one or more image formation apparatuses different from both of the first image formation apparatus and the second image formation apparatus, the display of the second image formation apparatus displays a list of jobs, processing of each of the jobs being held.

7. The image formation system according to claim 3, wherein when a predetermined condition is satisfied, the controller of the second image formation apparatus deletes a job including the data, processing of each of the jobs being held.

8. The image formation system according to claim 7, wherein the predetermined condition includes a condition that the data identified by the data identification information is unattainable from an external device.

9. The image formation system according to claim 7, wherein the predetermined condition includes a condition that a period in which processing on the data identified by the data identification information is not performed by the controller of the second image formation apparatus reaches a predetermined period.

10. The image formation system according to claim 7, wherein
the specific information is information in which an available external device is determined for each of the plurality of image formation apparatuses,
at least one of the plurality of image formation apparatuses newly acquires the specific information, and
the predetermined condition includes a condition that an external device is unavailable based on the acquired specific information.

11. The image formation system according to claim 1, wherein the controller of the first image formation apparatus transmits a command corresponding to the job setting via a network to the second image formation apparatus designated by the user.

12. The image formation system according to claim 1, wherein
the controller of the first image formation apparatus stores the data and job data in an external device, and
the controller of the second image formation apparatus acquires the data and the job data stored in the external device and performs processing on the acquired data based on the acquired job data.

13. The image formation system according to claim 1, wherein
the display of the first image formation apparatus displays identification information of each of two or more image formation apparatuses specified by the controller of the first image formation apparatus, and
the controller of the first image formation apparatus is capable of accepting a user's designation of a plurality of pieces of identification information among two or more pieces of the identification information displayed by the display of the first image formation apparatus.

14. The image formation system according to claim 1, wherein
the controller of the first image formation apparatus is capable of detecting connections of a plurality of external devices,
the display of the first image formation apparatus displays identification information of each of the plurality of external devices detected by the controller of the first image formation apparatus,
the controller of the first image formation apparatus accepts a user's designation of a plurality of pieces of the identification information displayed by the display of the first image formation apparatus, and
the controller of the second image formation apparatus performs processing on data stored in an external device with the identification information designated by the user.

15. The image formation system according to claim 1, wherein when accepting a user's designation of a plurality of pieces of identification information displayed by the display of the first image formation apparatus, the display of the first image formation apparatus displays an image for causing the user to select to
cause a different image formation apparatus to perform processing for each external device with a corresponding one of the plurality of pieces of identification information, designation of each of the plurality of pieces of identification information being accepted, or
cause an identical image formation apparatus to perform processing for each external device with a corresponding one of the plurality of pieces of identification information.

16. The image formation system according to claim 1, wherein when the controller of the first image formation apparatus detects a connection of a new external device during the job setting, the display of the first image formation apparatus displays an image for causing the user to select whether to determine data stored in the new external device as a target of the job setting being performed.

17. The image formation system according to claim 1, wherein when a login is performed with an identical user ID in the first image formation apparatus and the second image formation apparatus, the controller of the second image formation apparatus performs processing on the data based on the command.

18. The image formation system according to claim 1, wherein the display of the first image formation apparatus displays identification information of the specified one or more image formation apparatuses in accordance with a degree of priority corresponding to closeness to the image formation apparatus that has detected a connection of an external device for each of the specified one or more image formation apparatuses.

19. The image formation system according to claim 1, wherein the display of the first image formation apparatus displays
identification information of each of one or more other image formation apparatuses, and
map information showing respective positions of the one or more other image formation apparatuses.

20. The image formation system according to claim 1, wherein for a user ID input in user authentication of the first image formation apparatus, the display of the first image formation apparatus displays identification information of the specified one or more image formation apparatuses in accordance with a degree of priority corresponding to a usage frequency for each of the specified one or more image formation apparatuses.

21. The image formation system according to claim 1, wherein the specific information is information transmitted from a management device.

22. The image formation system according to claim 1, wherein the specific information is information possessed by one image formation apparatus of the plurality of image formation apparatuses.

23. An image formation apparatus comprising:
a controller, and
a display, wherein
the controller
  detects a connection of an external device,
  acquires identification information of the detected external device, and
  specifies, by using specific information, one or more image formation apparatuses capable of using the detected external device among a plurality of image formation apparatuses including the image formation apparatus,
displays identification information of each of the specified one or more image formation apparatuses on the display,
  accepts a user's designation of the identification information of each of the specified one or more image formation apparatuses which is displayed by the display,
  performs a job setting including designation of data stored in the external device, and
  when an image formation apparatus with the identification information designated by a user is a second image formation apparatus different from the first image formation apparatus, transmits a command corresponding to the job setting to the second image formation apparatus.

24. A control method of controlling an image formation apparatus, the method comprising:
detecting a connection of an external device;
acquiring identification information of the detected external device;
specifying, by using specific information, one or more image formation apparatuses capable of using the detected external device among a plurality of image formation apparatuses including the image formation apparatus;
displaying, on a display, identification information of each of the specified one or more image formation apparatuses,
accepting a user's designation of the identification information of each of the specified one or more image formation apparatuses,
performing a job setting including designation of data stored in the external device, and
when an image formation apparatus with the identification information designated by a user is a second image formation apparatus different from the first image formation apparatus, transmitting a command corresponding to the job setting to the second image formation apparatus.

* * * * *